US 9,168,456 B2

(12) United States Patent
Caputo et al.

(10) Patent No.: US 9,168,456 B2
(45) Date of Patent: *Oct. 27, 2015

(54) GAMING SYSTEM AND METHOD FOR PROVIDING A CASUAL WAGERING GAME

(71) Applicant: IGT, Las Vegas, NV (US)

(72) Inventors: Scott A. Caputo, Santa Clara, CA (US); Gregory F. Frank, Walnut Creek, CA (US); Ernest M. Lafky, San Francisco, CA (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/306,912

(22) Filed: Jun. 17, 2014

(65) Prior Publication Data

US 2014/0295969 A1 Oct. 2, 2014

Related U.S. Application Data

(63) Continuation of application No. 12/541,649, filed on Aug. 14, 2009, now Pat. No. 8,784,181.

(51) Int. Cl.
*A63F 13/00* (2014.01)
*A63F 13/40* (2014.01)
(Continued)

(52) U.S. Cl.
CPC .............. *A63F 13/10* (2013.01); *G07F 17/32* (2013.01); *G07F 17/3295* (2013.01); *A63F 9/24* (2013.01); *A63F 13/00* (2013.01)

(58) Field of Classification Search
CPC .................................. A63F 9/24; A63F 13/00
USPC .......................................................... 463/20
See application file for complete search history.

(56) References Cited

U.S. PATENT DOCUMENTS 2,585,268 A * 2/1952 Olsen ........................... 273/258
3,309,092 A * 3/1967 Hardesty et al. ............. 273/248
(Continued)

FOREIGN PATENT DOCUMENTS

CA  2 288 723   10/1998
EP  1 298 601   4/2003
(Continued)

OTHER PUBLICATIONS

Alhambra (board game) description, printed from http://en.wikipedia.org/wiki/Alhambra_(board_game) on Oct. 7, 2009, 4 pages.
(Continued)

*Primary Examiner* — Michael Grant
(74) *Attorney, Agent, or Firm* — Neal, Gerber & Eisenberg LLP

(57) ABSTRACT

Various embodiments of the present disclosure provide a casual wagering game including a matrix having a plurality of positions. A plurality of path endpoints are positioned along a perimeter of the matrix. Each path endpoint is associated with one of an award, a symbol indicating advancement to a subsequent level, and a terminator symbol. Each position, except a starting position, is configured to accommodate one of a plurality of tiles. Each tile includes one or more path segments. When the tiles are placed in certain configurations, path segments of bordering tiles form a complete path between the starting position and one or more of the path endpoints. The objective of the game is for a player to place tiles at positions in the matrix such that connecting path segments form a complete path between the start position and one or more path endpoints to win the path endpoint award(s).

30 Claims, 30 Drawing Sheets

(51) Int. Cl.
*G07F 17/32* (2006.01)
*A63F 9/24* (2006.01)

(56) References Cited

U.S. PATENT DOCUMENTS

| | | | |
|---|---|---|---|
| 3,695,615 A * | 10/1972 | Shoptaugh | 273/275 |
| 4,180,271 A * | 12/1979 | McMurchie | 273/275 |
| 4,190,256 A * | 2/1980 | Rudden, Jr. | 273/275 |
| 4,614,344 A * | 9/1986 | O'Connor | 273/283 |
| 5,324,040 A * | 6/1994 | Panda | 273/272 |
| 5,743,526 A | 4/1998 | Inoue | |
| 5,769,716 A | 6/1998 | Saffari et al. | |
| 5,931,467 A * | 8/1999 | Kamille | 273/139 |
| 5,947,820 A | 9/1999 | Morro et al. | |
| 6,050,895 A | 4/2000 | Luciano, Jr. et al. | |
| 6,267,669 B1 | 7/2001 | Luciano, Jr. et al. | |
| 6,309,300 B1 | 10/2001 | Glavich | |
| 6,315,664 B1 | 11/2001 | Baerlocher et al. | |
| 6,319,124 B1 | 11/2001 | Baerlocher et al. | |
| 6,334,814 B1 | 1/2002 | Adams | |
| 6,346,043 B1 | 2/2002 | Colin et al. | |
| 6,364,767 B1 | 4/2002 | Brossard et al. | |
| 6,386,974 B1 | 5/2002 | Adams | |
| 6,409,172 B1 | 6/2002 | Vancura | |
| 6,413,160 B1 | 7/2002 | Vancura | |
| 6,439,995 B1 | 8/2002 | Hughs-baird et al. | |
| 6,450,883 B1 | 9/2002 | O'halloran | |
| 6,460,856 B2 * | 10/2002 | Davies | 273/275 |
| 6,464,582 B1 | 10/2002 | Baerlocher et al. | |
| 6,494,785 B1 | 12/2002 | Gerrard et al. | |
| 6,511,375 B1 | 1/2003 | Kaminkow | |
| 6,514,141 B1 | 2/2003 | Kaminkow et al. | |
| 6,554,703 B1 | 4/2003 | Bussick et al. | |
| 6,558,254 B2 | 5/2003 | Baelocher et al. | |
| 6,561,899 B2 | 5/2003 | Vancura | |
| 6,572,472 B1 | 6/2003 | Glavich | |
| 6,572,473 B1 | 6/2003 | Baerlocher | |
| 6,582,307 B2 | 6/2003 | Web | |
| 6,595,854 B2 | 7/2003 | Hughs-baird et al. | |
| 6,599,785 B2 | 7/2003 | Hamada et al. | |
| 6,602,136 B1 | 8/2003 | Baerlocher et al. | |
| 6,602,137 B2 | 8/2003 | Kaminkow et al. | |
| 6,609,971 B2 | 8/2003 | Vancura | |
| 6,632,139 B1 | 10/2003 | Baerlocher | |
| 6,645,073 B2 | 11/2003 | Lemay et al. | |
| 6,666,765 B2 | 12/2003 | Vancura | |
| 6,669,559 B1 | 12/2003 | Baerlocher et al. | |
| 6,676,516 B2 | 1/2004 | Baerlocher et al. | |
| 6,692,356 B2 | 2/2004 | Baerlocher et al. | |
| 6,722,981 B2 | 4/2004 | Kaminkow et al. | |
| 6,722,982 B2 | 4/2004 | Kaminkow et al. | |
| 6,726,562 B2 | 4/2004 | Vancura | |
| 6,733,386 B2 | 5/2004 | Cuddy et al. | |
| 6,746,016 B2 | 6/2004 | Perrie et al. | |
| 6,746,328 B2 | 6/2004 | Cannon et al. | |
| 6,749,502 B2 | 6/2004 | Baerlocher | |
| 6,749,504 B2 | 6/2004 | Hughs-baird | |
| 6,752,717 B2 | 6/2004 | Vancura | |
| 6,761,632 B2 | 7/2004 | Bansemer et al. | |
| 6,761,633 B2 * | 7/2004 | Riendeau et al. | 463/16 |
| 6,769,983 B2 | 8/2004 | Slomiany | |
| 6,780,103 B2 | 8/2004 | Bansemer et al. | |
| 6,780,107 B2 | 8/2004 | Baerlocher et al. | |
| 6,783,455 B2 | 8/2004 | Glavich | |
| 6,783,457 B2 | 8/2004 | Hughs-Baird et al. | |
| 6,786,820 B2 | 9/2004 | Gerrard et al. | |
| 6,808,454 B2 | 10/2004 | Gerrard et al. | |
| 6,817,944 B2 | 11/2004 | Kaminkow et al. | |
| 6,840,858 B2 | 1/2005 | Adams | |
| 6,843,721 B2 | 1/2005 | Vancura | |
| 6,843,722 B2 | 1/2005 | Webb | |
| 6,852,027 B2 | 2/2005 | Kaminkow et al. | |
| 6,852,028 B2 | 2/2005 | Vancura | |
| 6,855,053 B2 | 2/2005 | Baerlocher | |
| 6,863,606 B1 | 3/2005 | Berg et al. | |
| 6,875,108 B1 | 4/2005 | Hughs-baird | |
| 6,878,061 B2 | 4/2005 | Baerlocher et al. | |
| 6,899,620 B2 | 5/2005 | Kaminkow et al. | |
| 6,908,383 B2 | 6/2005 | Baerlocher et al. | |
| 6,918,830 B2 | 7/2005 | Baerlocher | |
| 6,918,834 B2 | 7/2005 | Vancura | |
| 6,929,545 B2 | 8/2005 | Vancura | |
| 6,929,952 B2 | 8/2005 | Baerlocher | |
| 6,932,701 B2 | 8/2005 | Glavich et al. | |
| 6,939,229 B2 | 9/2005 | Mcclintic | |
| 6,942,568 B2 | 9/2005 | Baerlocher | |
| 6,958,013 B2 | 10/2005 | Miereau et al. | |
| 6,964,416 B2 | 11/2005 | Mcclintic et al. | |
| 6,966,833 B2 | 11/2005 | Kaminkow et al. | |
| 6,971,953 B2 | 12/2005 | Gerrard et al. | |
| 6,984,174 B2 | 1/2006 | Cannon et al. | |
| 6,986,711 B2 | 1/2006 | Vancura | |
| 6,988,732 B2 | 1/2006 | Vancura | |
| 6,988,947 B2 | 1/2006 | Baerlocher et al. | |
| 7,037,191 B2 | 5/2006 | Rodgers et al. | |
| 7,040,983 B2 | 5/2006 | Dolloff et al. | |
| 7,040,984 B2 | 5/2006 | Mead | |
| 7,056,192 B2 | 6/2006 | Venigalla et al. | |
| 7,056,210 B2 | 6/2006 | Bansemer et al. | |
| 7,056,214 B2 | 6/2006 | Miereau et al. | |
| 7,059,967 B2 | 6/2006 | Baerlocher | |
| 7,073,793 B2 | 7/2006 | Vancura | |
| 7,077,744 B2 | 7/2006 | Cannon | |
| 7,086,945 B2 | 8/2006 | Vancura | |
| 7,104,888 B2 | 9/2006 | Miereau et al. | |
| 7,112,137 B2 | 9/2006 | Baerlocher et al. | |
| 7,121,942 B2 | 10/2006 | Baerlocher | |
| 7,128,646 B2 | 10/2006 | Baerlocher et al. | |
| 7,160,186 B2 | 1/2007 | Cuddy et al. | |
| 7,160,188 B2 | 1/2007 | Kaminkow et al. | |
| 7,172,506 B2 | 2/2007 | Baerlocher et al. | |
| 7,175,521 B2 | 2/2007 | Mcclintic | |
| 7,175,524 B2 | 2/2007 | Bansemer et al. | |
| 7,182,689 B2 | 2/2007 | Hughs-baird et al. | |
| 7,192,343 B2 | 3/2007 | Vancura | |
| 7,217,187 B2 | 5/2007 | Vancura | |
| 7,229,350 B2 | 6/2007 | Baerlocher et al. | |
| 7,234,700 B2 | 6/2007 | Vancura | |
| 7,235,011 B2 | 6/2007 | Randall et al. | |
| 7,247,096 B2 | 7/2007 | Vancura | |
| 7,252,591 B2 | 8/2007 | Van Asdale | |
| 7,264,545 B2 | 9/2007 | Maya et al. | |
| 7,273,415 B2 | 9/2007 | Cregan et al. | |
| 7,294,055 B2 | 11/2007 | Baerlocher et al. | |
| 7,300,348 B2 | 11/2007 | Kaminkow et al. | |
| 7,303,469 B2 | 12/2007 | Kaminkow | |
| 7,314,409 B2 | 1/2008 | Maya et al. | |
| 7,316,609 B2 | 1/2008 | Dunn et al. | |
| 7,326,115 B2 | 2/2008 | Baerlocher | |
| 7,335,102 B2 | 2/2008 | Baerlocher et al. | |
| 7,338,367 B2 | 3/2008 | Kaminkow et al. | |
| 7,338,369 B2 | 3/2008 | Mierau et al. | |
| 7,341,512 B2 | 3/2008 | Dolloff et al. | |
| 7,351,141 B2 | 4/2008 | Rodgers et al. | |
| 7,371,174 B2 | 5/2008 | Baerlocher | |
| 7,377,849 B2 | 5/2008 | Baerlocher et al. | |
| 7,399,226 B2 | 7/2008 | Mishra | |
| 7,402,103 B2 | 7/2008 | Baerlocher | |
| 7,413,510 B2 | 8/2008 | Schlegel et al. | |
| 7,419,431 B2 | 9/2008 | Gauselmann et al. | |
| 7,448,948 B2 | 11/2008 | Hughs-baird et al. | |
| 7,488,250 B2 | 2/2009 | Baerlocher et al. | |
| 7,494,412 B2 | 2/2009 | Baerlocher | |
| 7,541,252 B2 | 6/2009 | Eun et al. | |
| 7,544,129 B2 | 6/2009 | Baerlocher | |
| 7,578,136 B2 | 8/2009 | Derouineau et al. | |
| 7,708,627 B2 * | 5/2010 | Lind | 463/16 |
| 7,997,979 B2 * | 8/2011 | Gatto et al. | 463/25 |
| 8,007,358 B2 * | 8/2011 | Linard et al. | 463/20 |
| 8,033,904 B2 * | 10/2011 | Gatto et al. | 463/16 |
| 8,042,809 B2 * | 10/2011 | Walker et al. | 273/139 |
| 8,070,581 B2 * | 12/2011 | Linard et al. | 463/16 |
| 2001/0024970 A1 | 9/2001 | Mckee et al. | |
| 2001/0038178 A1 | 11/2001 | Vancura | |

(56) References Cited

U.S. PATENT DOCUMENTS

| | | |
|---|---|---|
| 2002/0052232 A1 | 5/2002 | Kaminkow |
| 2003/0190945 A1 | 10/2003 | Bussick et al. |
| 2004/0048649 A1 | 3/2004 | Peterson et al. |
| 2004/0053665 A1 | 3/2004 | Baerlocher |
| 2004/0067790 A1 | 4/2004 | Peterson et al. |
| 2004/0082374 A1 | 4/2004 | Maya et al. |
| 2004/0082378 A1 | 4/2004 | Peterson et al. |
| 2004/0106444 A1 | 6/2004 | Cuddy et al. |
| 2004/0176156 A1 | 9/2004 | Walker et al. |
| 2004/0204223 A1 | 10/2004 | Cuddy et al. |
| 2004/0248639 A1 | 12/2004 | Slomiany |
| 2005/0020351 A1 | 1/2005 | Baerlocher et al. |
| 2005/0033461 A1 | 2/2005 | Gerrard et al. |
| 2005/0054405 A1 | 3/2005 | Baerlocher et al. |
| 2005/0054415 A1 | 3/2005 | Kaminkow et al. |
| 2005/0054416 A1 | 3/2005 | Hostetler et al. |
| 2005/0054434 A1 | 3/2005 | Baerlocher et al. |
| 2005/0054435 A1 | 3/2005 | Rodgers et al. |
| 2005/0054436 A1 | 3/2005 | Frizzell et al. |
| 2005/0059456 A1 | 3/2005 | Mead et al. |
| 2005/0059461 A1 | 3/2005 | Ching et al. |
| 2005/0096123 A1 | 5/2005 | Cregan et al. |
| 2005/0101372 A1 | 5/2005 | Mierau et al. |
| 2005/0101378 A1 | 5/2005 | Kaminkow et al. |
| 2005/0181853 A1 | 8/2005 | Baerlocher |
| 2005/0192081 A1 | 9/2005 | Marks et al. |
| 2006/0003832 A1* | 1/2006 | Mincey et al. .................. 463/25 |
| 2006/0025196 A1 | 2/2006 | Webb et al. |
| 2006/0030401 A1 | 2/2006 | Mead et al. |
| 2006/0046836 A1 | 3/2006 | Walker et al. |
| 2006/0068882 A1 | 3/2006 | Baerlocher et al. |
| 2006/0073874 A1 | 4/2006 | Cregan et al. |
| 2006/0084500 A1 | 4/2006 | Baerlocher et al. |
| 2006/0183528 A1 | 8/2006 | Rodgers et al. |
| 2006/0205474 A1 | 9/2006 | Bansemer et al. |
| 2006/0246977 A1 | 11/2006 | Cannon |
| 2007/0015566 A1 | 1/2007 | Baerlocher et al. |
| 2007/0021176 A1 | 1/2007 | Jackson |
| 2007/0032285 A1 | 2/2007 | Wolf |
| 2007/0060271 A1 | 3/2007 | Cregan et al. |
| 2007/0087809 A1 | 4/2007 | Baerlocher |
| 2007/0111783 A1 | 5/2007 | Cuddy et al. |
| 2007/0117606 A1 | 5/2007 | Baerlocher et al. |
| 2007/0129128 A1 | 6/2007 | McClintic |
| 2007/0129131 A1 | 6/2007 | Kaminkow et al. |
| 2007/0129133 A1 | 6/2007 | Bansemer et al. |
| 2007/0149267 A1 | 6/2007 | Ross et al. |
| 2007/0149269 A1 | 6/2007 | Benbrahim |
| 2008/0004105 A1 | 1/2008 | Cregan et al. |
| 2008/0119283 A1 | 5/2008 | Baerlocher |
| 2008/0146321 A1 | 6/2008 | Parente |
| 2008/0188287 A1 | 8/2008 | Schlegel et al. |
| 2008/0200238 A1 | 8/2008 | Mishra |
| 2008/0311980 A1 | 12/2008 | Cannon |
| 2009/0104959 A1 | 4/2009 | Caputo et al. |
| 2009/0166971 A1* | 7/2009 | Mebane .................. 273/153 R |

FOREIGN PATENT DOCUMENTS

| | | | |
|---|---|---|---|
| EP | 1 336 941 | 8/2003 | |
| EP | 1 617 386 | 1/2006 | |
| EP | 1 635 306 | 3/2006 | |
| GB | 2103495 A * | 2/1983 | ................ A63F 1/00 |
| GB | 2 147 773 | 5/1985 | |
| GB | 2 191 030 | 12/1987 | |
| GB | 2 262 642 | 6/1993 | |
| GB | 2 333 880 | 8/1999 | |
| GB | 2 341 262 | 3/2000 | |
| GB | 2 353 128 | 2/2001 | |
| GB | 2 422 121 | 7/2006 | |
| WO | WO 96/35491 | 11/1996 | |
| WO | WO 00/12186 | 3/2000 | |
| WO | WO 01/744464 | 10/2001 | |
| WO | WO 01/93967 | 12/2001 | |
| WO | WO 2005/027058 | 3/2005 | |
| WO | WO 2005/027061 | 3/2005 | |
| WO | WO 2005/035080 | 4/2005 | |
| WO | WO 2005/057339 | 6/2005 | |
| WO | WO 2005/075037 | 8/2005 | |
| WO | WO 2005/105241 | 11/2005 | |
| WO | WO 2006/009248 | 1/2006 | |
| WO | WO 2007021724 | 7/2007 | |

OTHER PUBLICATIONS

Aphrodite Advertisement, written by Atronic, published 2004, 1 page.

Bejeweled game description, printed from http://www.astraware.com/all/featured/bejeweled/ on Nov. 4, 2009, 2 pages.

Bendomino game description, printed from http://en.wikipedia.org/wiki/bendomino on Oct. 7, 2009, 3 pages.

Betrayal at House on the Hill game description, printed from http://en.wikipedia.org/wiki/betrayal_at_house_on_the_hill on Oct. 7, 2009, 2 pages.

Blokus game description, printed from http://en.wikipedia.org/wiki/blokus on Oct. 7, 2009, 4 pages.

Bomberman game description, printed from http://en.wikipedia.org/wiki/bomberman on Oct. 7, 2009, 3 pages.

Boulder Dash game description, printed from http://en.wikipedia.org/wiki/boulder_dash on Oct. 7, 2009, 3 pages.

Carcassonne (board game) description, printed from http://en.wikipedia.org/wiki/carcassonne_(board_game) on Oct. 7, 2009, 9 pages.

Carnival of Mystery-MultiWay by International Game Technology Article description, written by, Strictly Slots published Jul. 2005, 1 page.

Cats "n" Mouse 2 Advertisement, written by Unidesa Gaming & Systems, published prior to Aug. 14, 2009, 2 pages.

Chinese Dominoes game description, printed from http://en.wikipedia.org/wiki/Chinese_dominoes on Oct. 7, 2009, 2 pages.

Chip's Challenge game description, printed from http://en.wikipedia.org/wiki/chip%/27s_challenge on Oct. 7, 2009, 5 pages.

Civilization (video game) description, printed from http://en.wikipedia.org/wiki/civilization_(computer game) on Oct. 7, 2009, 7 pages.

Clowning Around Advertisement, written by Atronic, published 2002, 1 page.

DaVinci Diamonds Slot Game description, printed from http://www.newslotgames.com/newslot-games/davinci-diamonds.ww.asp on Nov. 4, 2009, 7 pages.

Denver Duck and the Quest for the Golden Egg Advertisement, written by IGT, published 2004, 2 pages.

Deviled Eggs by Aristocrat Technologies Article, written by Strictly Slots, published May 2005, 1 page.

Diceland game description, printed from http://en.wikipedia.org/wiki/diceland on Oct. 7, 2009, 1 page.

Dig Dug game description, printed from http://en.wikipedia.org/wiki/dig_dug on Oct. 7, 2009, 5 pages.

Dominoes game description, printed from http://en.wikipedia.org/wiki/dominoes on Oct. 7, 2009, 9 pages.

Dungeons & Dragons game description, printed from http://en.wikipedia.org/wiki/D%26D on Oct. 7, 2009, 20 pages.

Dweep game description, printed from http://en.wikipedia.org/wiki/dweep on Oct. 7, 2009, 2 pages.

Fjords (board game) description, printed from http://en.wikipedia.org/wiki/fjords_(board_game) on Oct. 7, 2009, 1 page.

Frog Wild by Aristocrat Technologies Article, written by Strictly Slots, published Nov. 2001, 1 page.

Garfield Advertisement, written by Mikohn, published 2003, 1 page.

Gheos game description, printed from http://en.wikipedia.org/wiki/gheos on Oct. 7, 2009, 2 pages.

Gold Box game description, printed from http://en.wikipedia.org/wiki/gold_box on Oct. 7, 2009, 4 pages.

Heroes of Might and Magic game description, printed from http://en.wikipedia.org/wiki/heroes_of-might_and_magic on Oct. 7, 2009, 6 pages.

Hive (game) description, printed from http://en.wikipedia.org/wiki/hive_(game) on Oct. 7, 2009, 5 pages.

(56) References Cited

OTHER PUBLICATIONS

Iron Horse Board Game description, printed from http://boardgamegeek.com/boardgame/5100 on Oct. 7, 2009, 4 pages.
List of Maze Video Games description, printed from hhtp://en.wikipedia.org/wiki/maze_games on Oct. 7, 2009, 3 pages.
Mahjong game description, printed from http://en.wikipedia.org/wiki/mahjong on Oct. 7, 2009, 17 pages.
Maze game description, printed from http://en.wikipedia.org/wiki/maze on Oct. 27, 2009, 10 pages.
Metro Board Game description, printed from http://boardgamegeek.com/boardgame/559 on Oct. 7, 2009, 6 pages.
Metro-Cross game description, printed from hhtp://en.wikipedia.org/wiki/metro-cross on Oct. 7, 2009, 2 pages.
Neverwinter Nights (AOL game) description, printed from http://en.wikipedia.org/wiki/neverwinter_nights_(AOL_game) on Oct. 7, 2009, 3 pages.
Okey game description, printed from http://en.wikipedia.org/wiki/okey on Oct. 7, 2009, 1 page.
Pac-Man game description, printed from http://en.wikipedia.org/wiki/pac-man on Oct. 7, 2009, 13 pages.
Q*bert game description, printed from http://en.wikipedia.org/wiki/Q-bert on Oct. 7, 2009, 8 pages.
Quad-Ominos game description, printed from http://en.wikipedia.org/wiki/quad-ominos on Oct. 7, 2009, 2 pages.
Rummikub game description, printed from http://en.wikipedia.org/wiki/rummikub on Oct. 7, 2009, 6 pages.
Scrabble game description, printed from http://en.wikipedia.org/wiki/scrabble on Oct. 7, 2009, 17 pages.
SimCity game description, printed from http://en.wikipedia.org/wiki/simcity on Oct. 7, 2009, 9 pages.
Sliding Puzzle game description, printed from http://en.wikipedia.org/wiki/sliding_puzzle on Oct. 7, 2009, 3 pages.
Spaghetti Junction Board Game description, printed from http://boardgamegeek.com/boardgame/10486 on Oct. 7, 2009, 4 pages.
StarCraft game description, printed from http://en.wikipedia.org/wiki/starcraft on Oct. 7, 2009, 16 pages.
Steam Tunnel Board Game description, printed from http://boardgamegeek.com/boardgame/5837 on Oct. 7, 2009, 5 pages.
Streetcar Board Game description, printed from http://boardgamegeek.com/boardgame/1597 on Oct. 7, 2009, 6 pages.
Tantrix game description, printed from http://en.wikipedia.org/wiki/tantrix on Oct. 7, 2009, 4 pages.
Tetris game description, printed from http://en.wikipedia.org/wiki/tetris on Oct. 7, 2009, 15 pages.
The Ancient Art of War game description, printed from http://en.wikipedia.org/wiki/ancient_art_of_war on Oct. 7, 2009, 3 pages.
The Munsters Advertisement, written by IGT, published 2001, 4 pages.
The Settlers of Catan description, printed from http://en.wikipedia.org/wiki/the_settlers_of_catan on Oct. 7, 2009, 5 pages.
Tile-based game description, printed from http://en.wikipedia.org/wiki/tile-based_game on Oct. 7, 2009, 3 pages.
Totally Puzzled Video Slots Advertisement, written by IGT, published 2004, 2 pages.
Triominoes game description, printed from http://en.wikipedia.org/wiki/triominos on Oct. 7, 2009, 3 pages.
Triple Double Dollars Video Slots Advertisement, written by IGT, published 2004, 2 pages.
Tsuro Board Game description, printed from http://boardgamegeek.com/boardgame/16992 on Oct. 7, 2009, 6 pages.
Tsuro game description, printed from http://en.wikipedia.org/wiki/tsuro on Oct. 7, 2009, 1 page.
Ultima (series) game description, printed from http://en.wikipedia.org/wiki/ultima_(video_game-series) on Oct. 7, 2009, 8 pages.
Uno (card game) game description, printed from http://en.wikipedia.org/wiki/uno_(game) on Oct. 7, 2009, 9 pages.
Utopia (video game) description, printed from http://en.wikipedia.org/wiki/utopia_(video_game) on Oct. 7, 2009, 2 pages.
Xanadu Red/Black Advertisement, written by Atronic, published 2004, 1 page.
Zombies!!! Game description, printed from http://en.wikipedia.org/wiki/zombies!!! on Oct. 7, 2009, 4 pages.

* cited by examiner

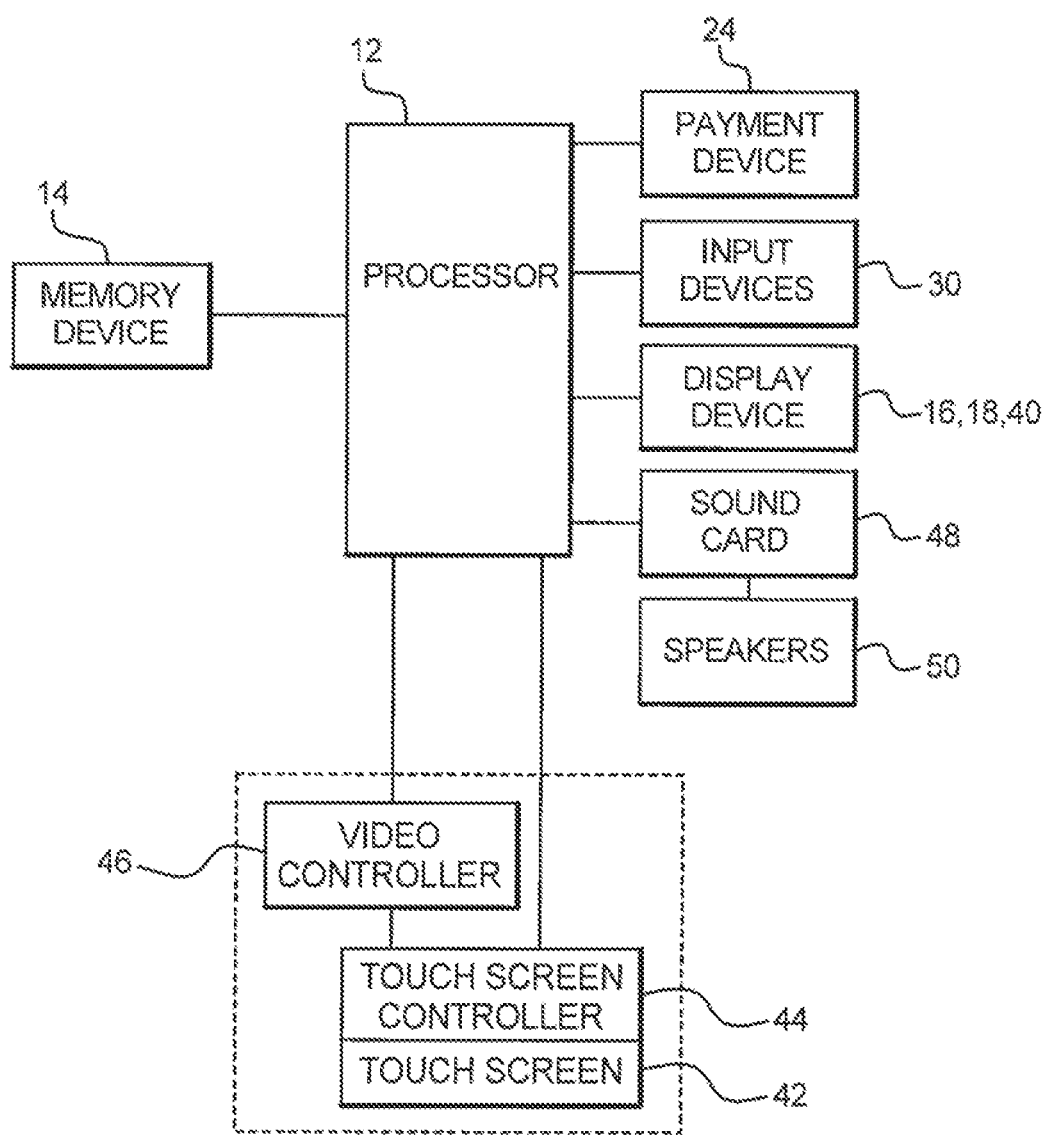

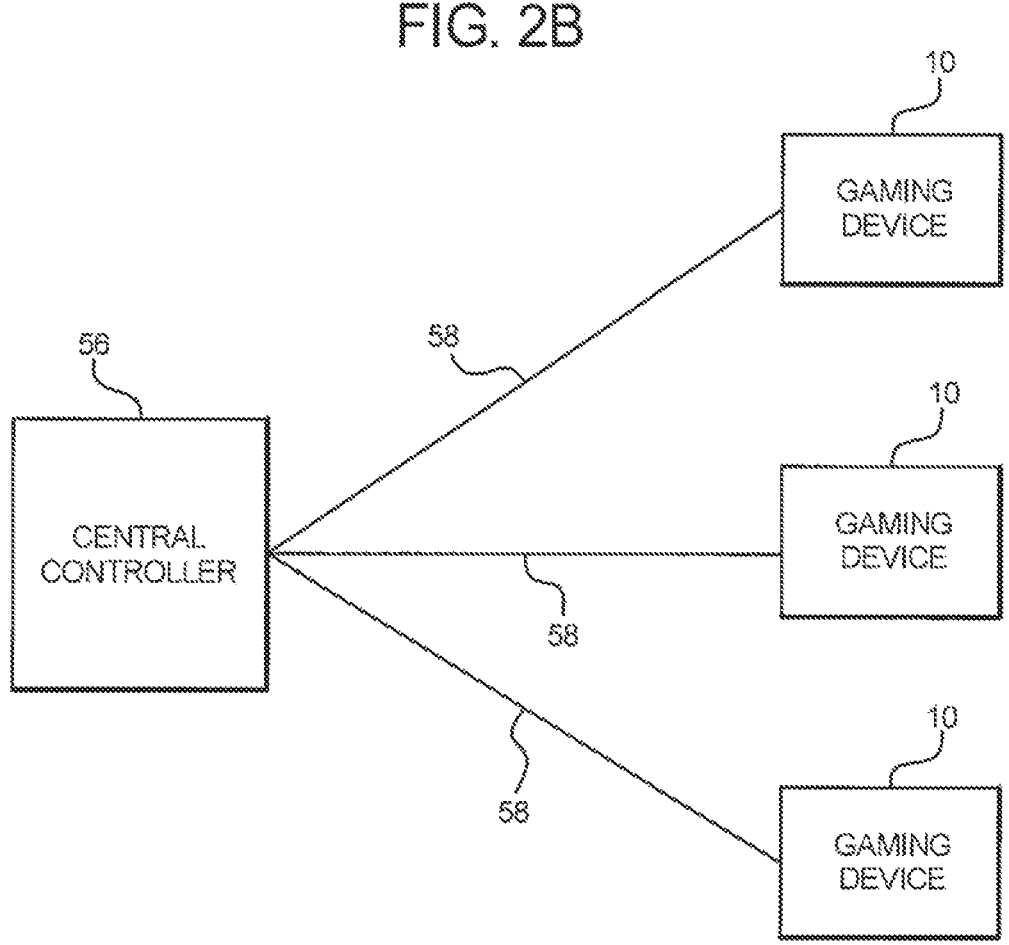

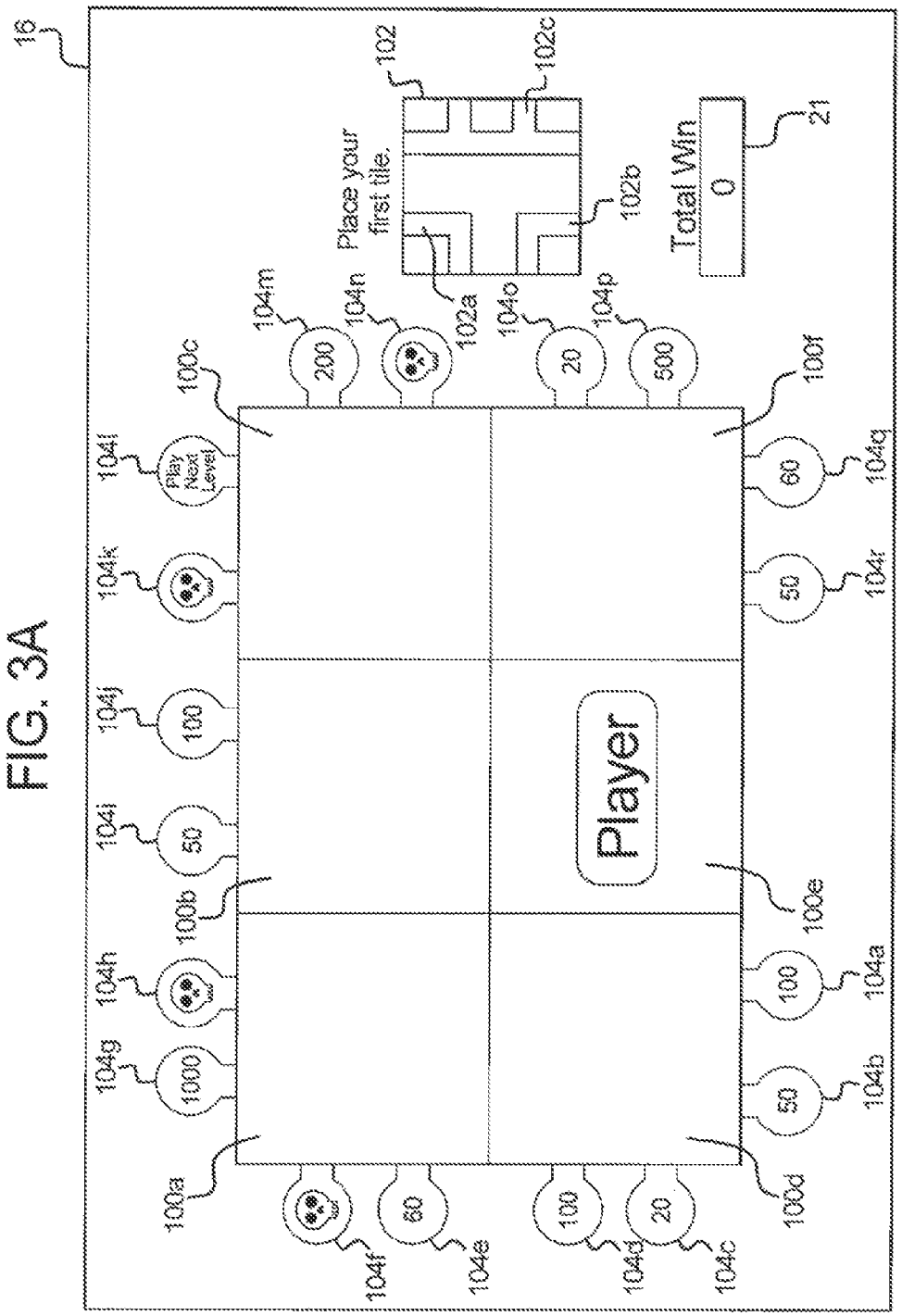

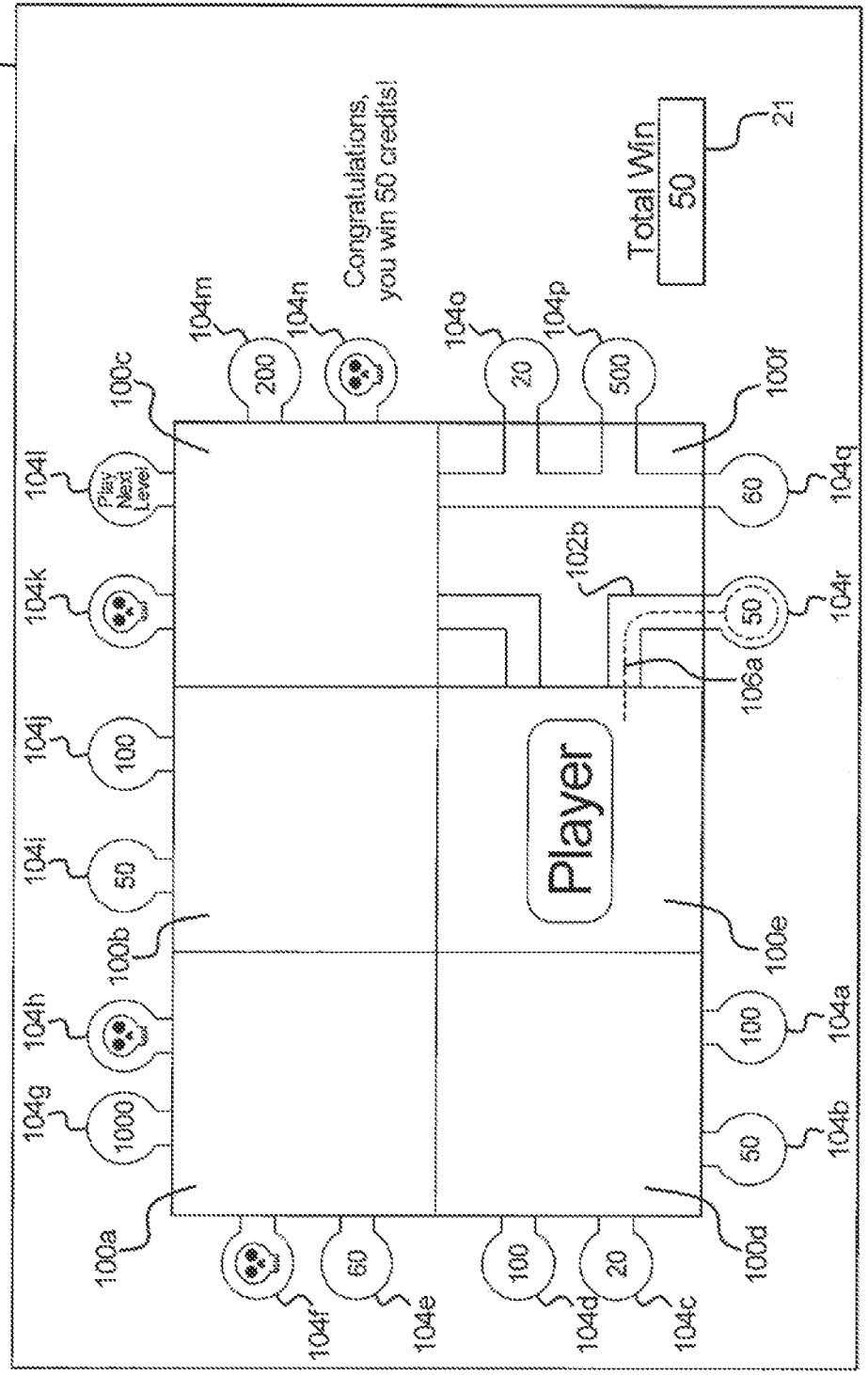

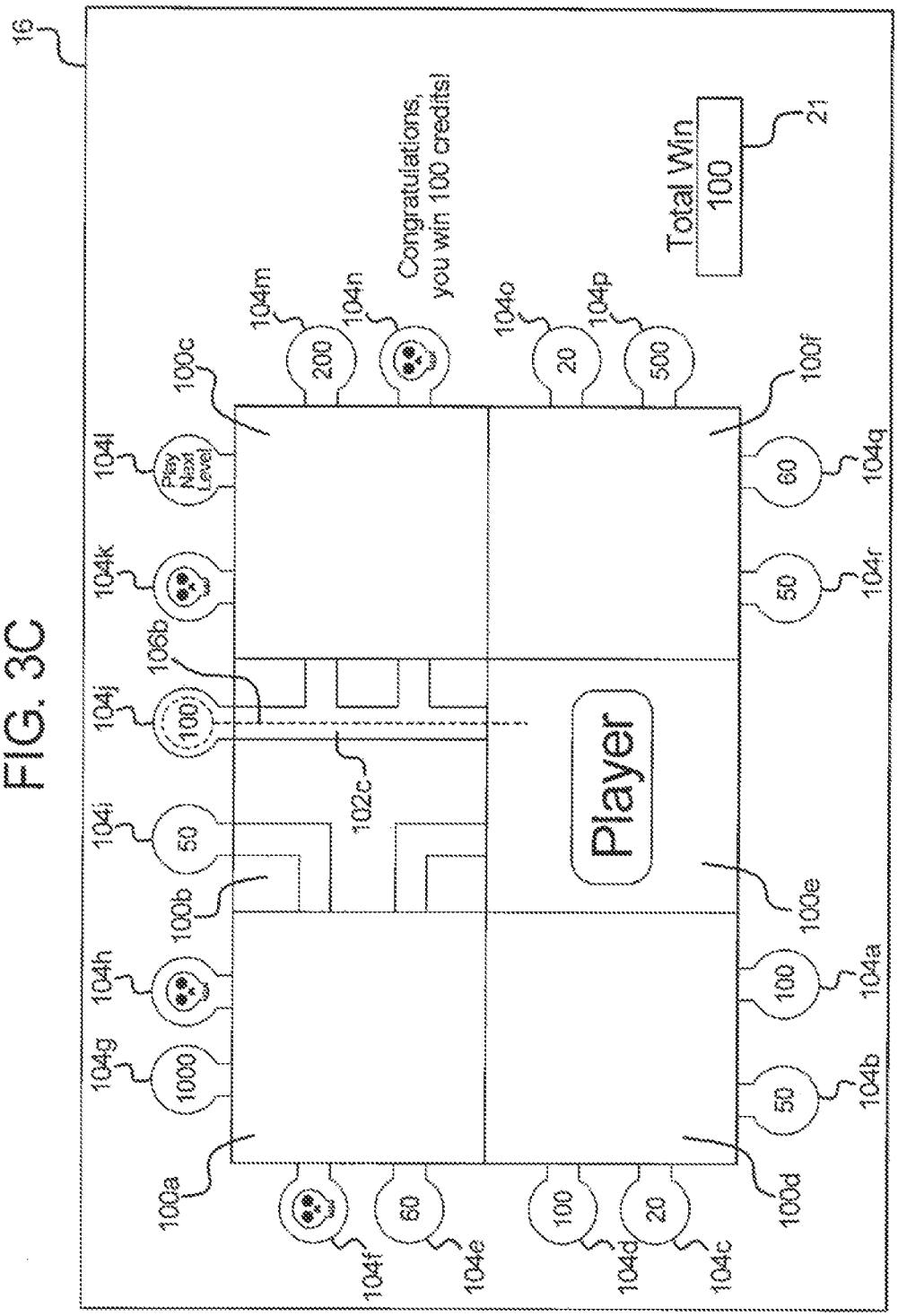

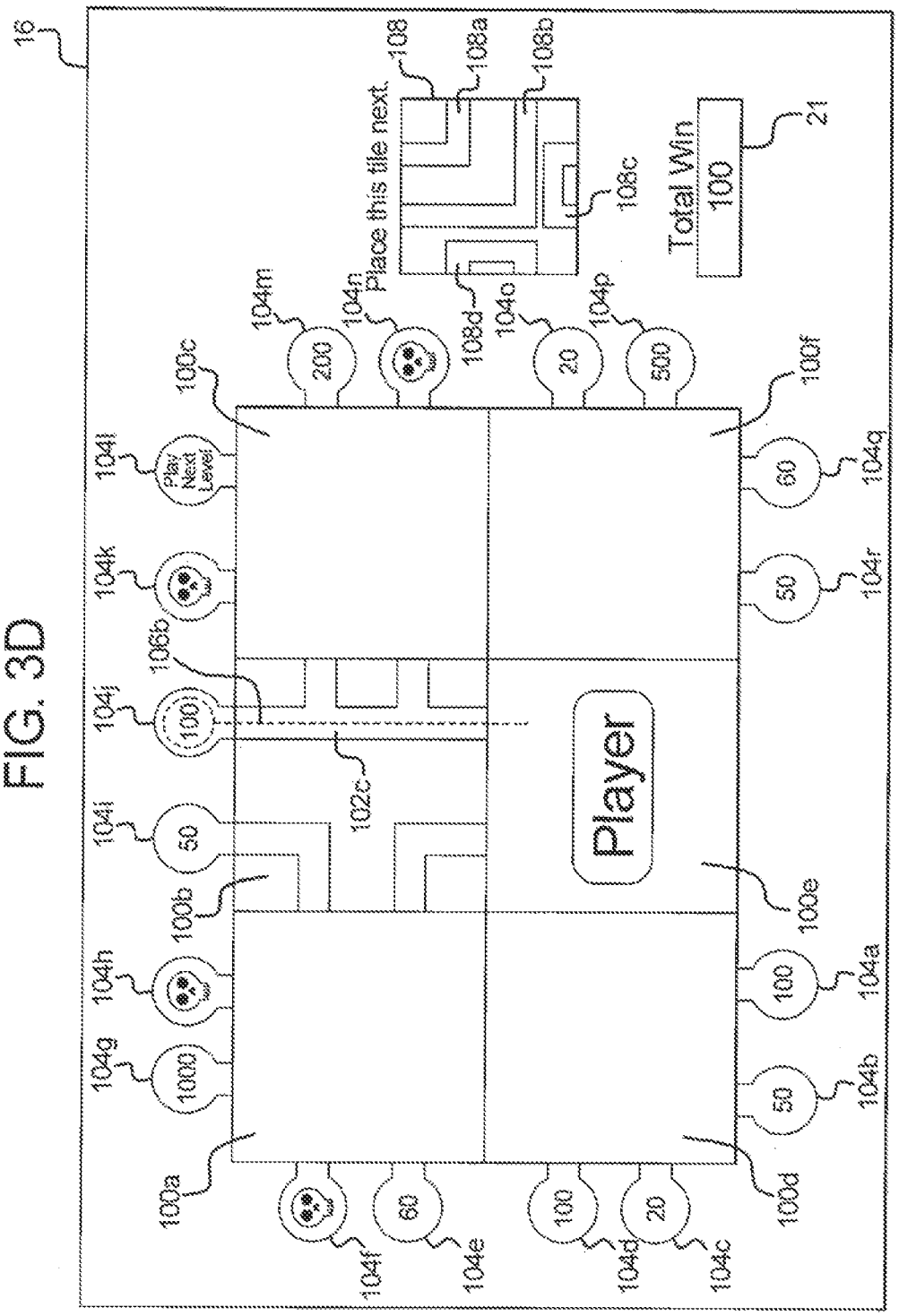

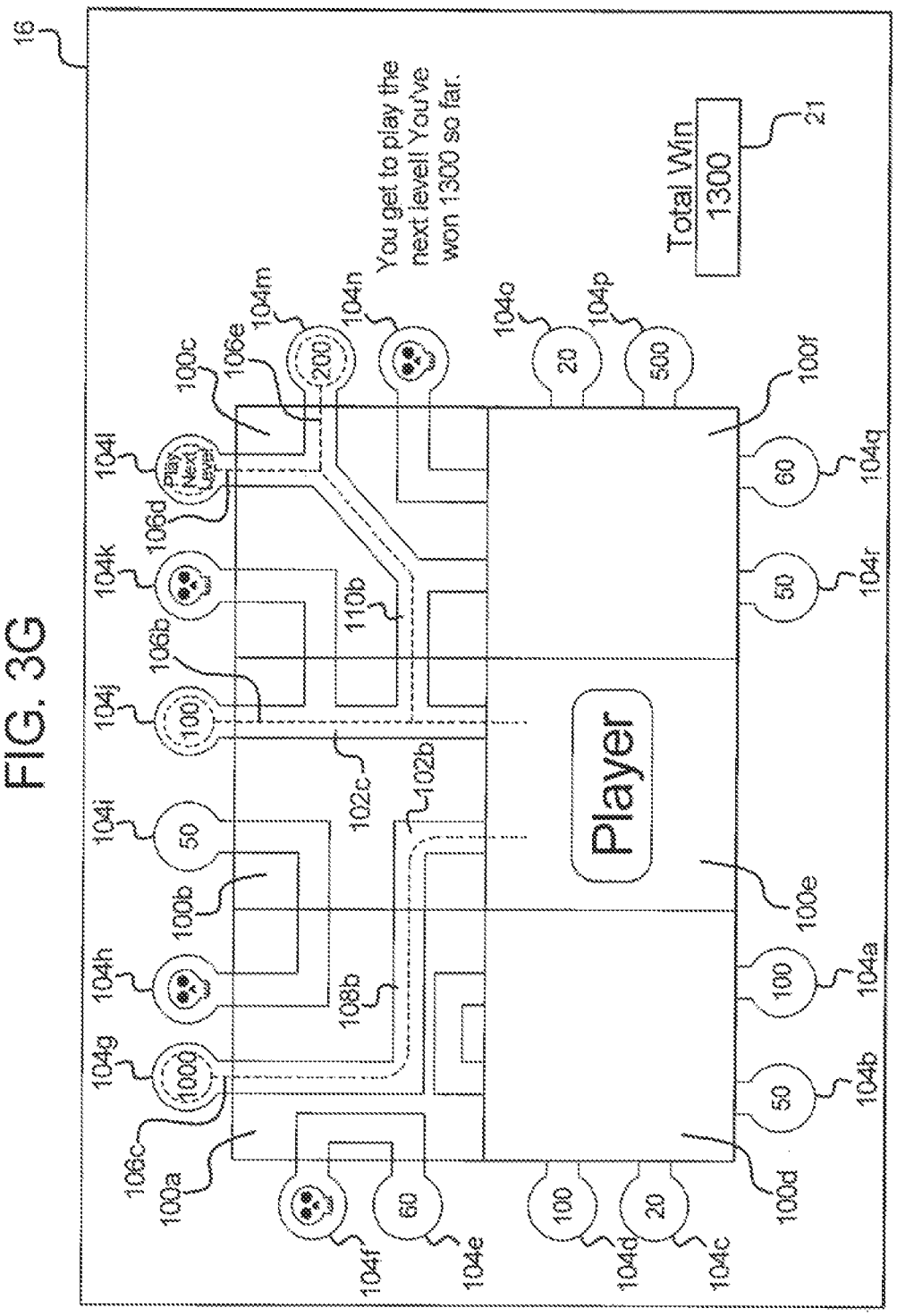

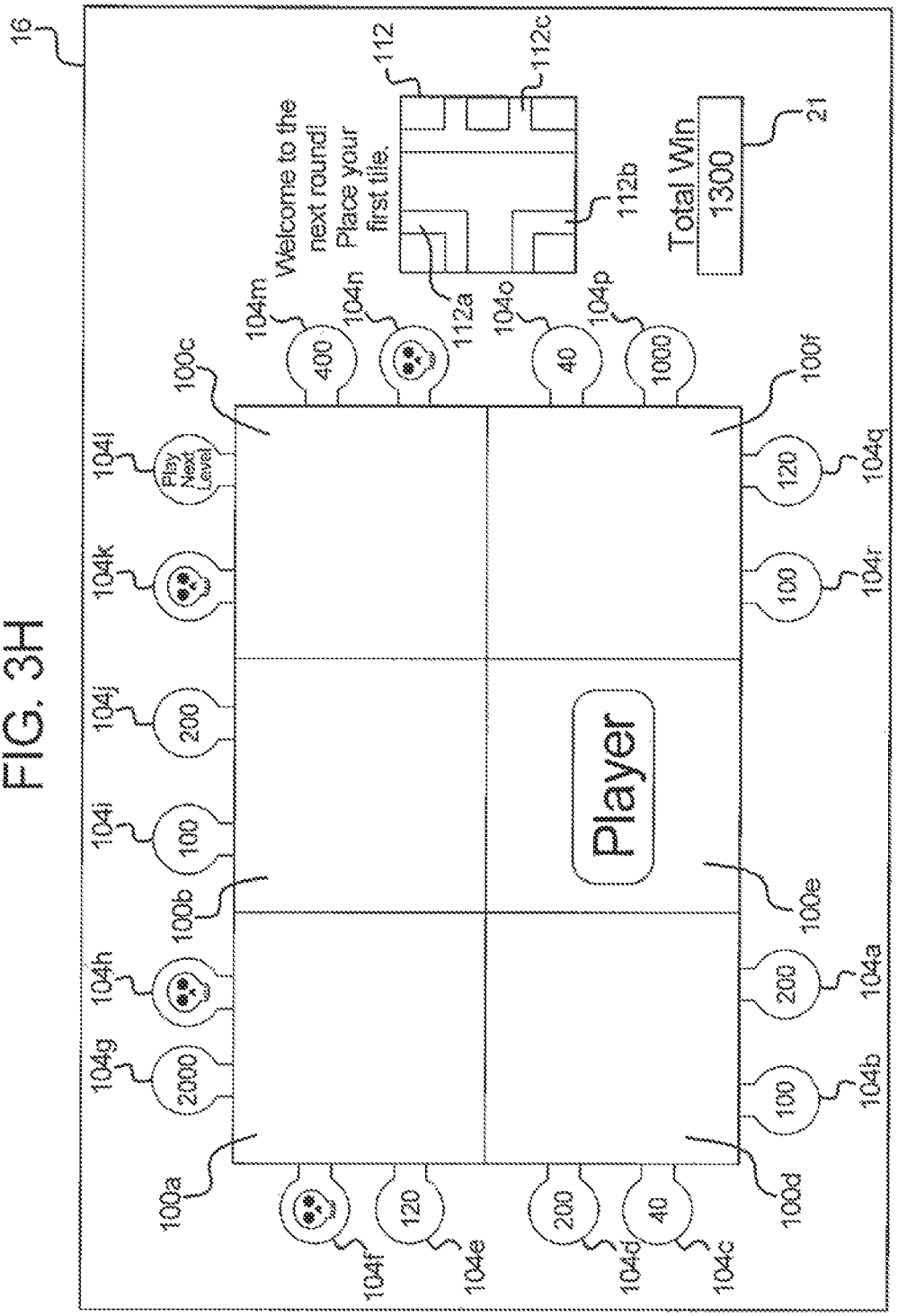

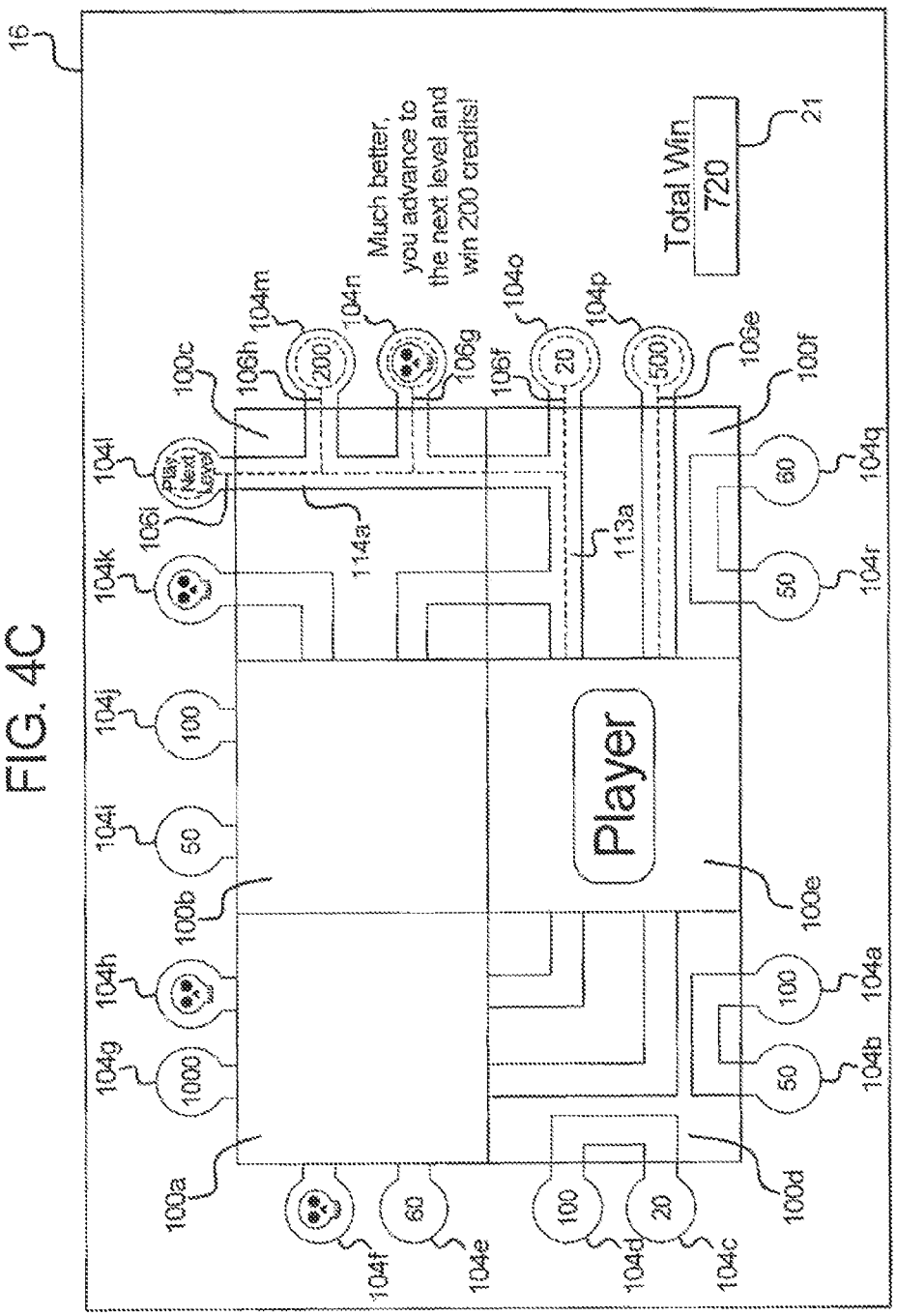

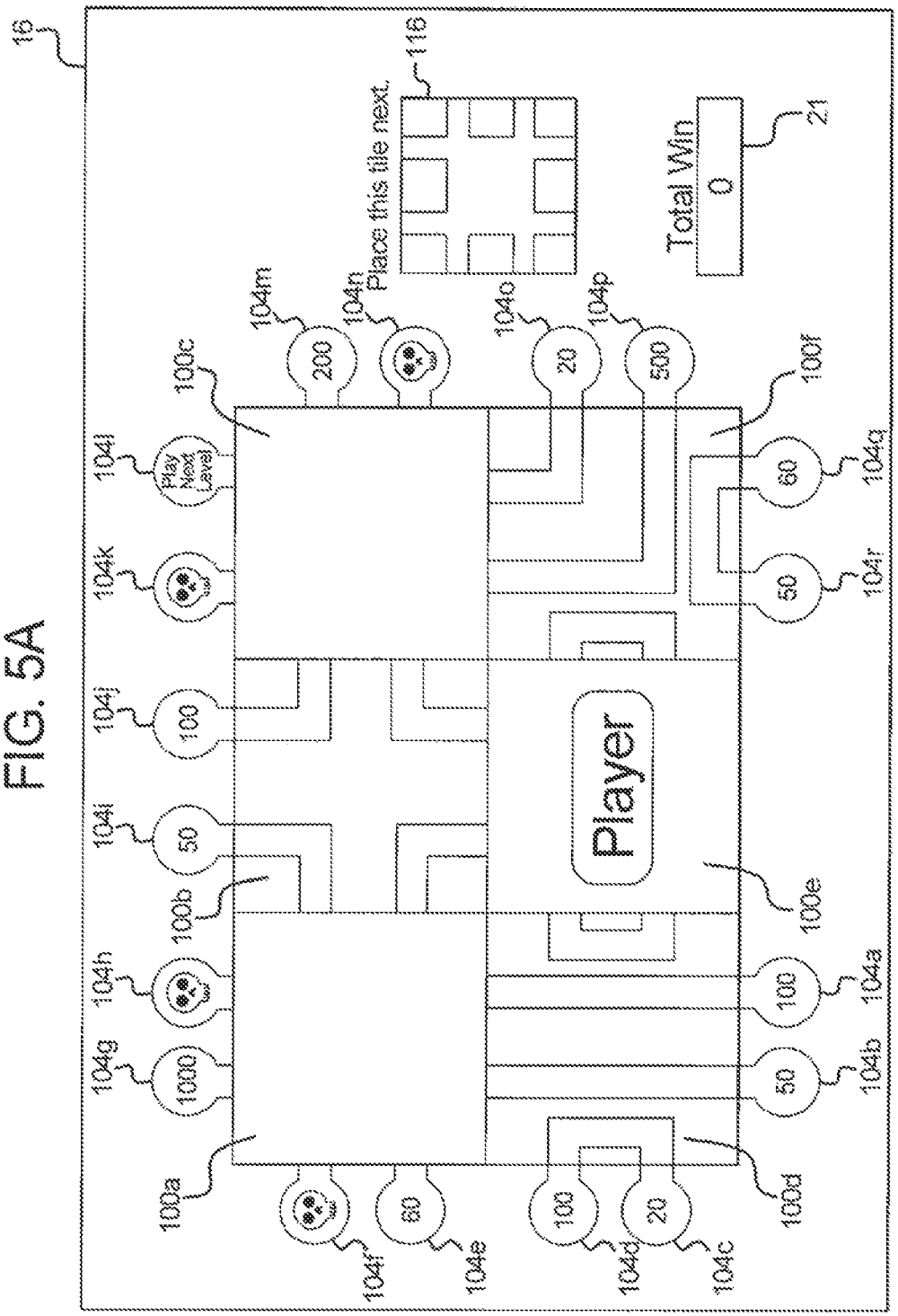

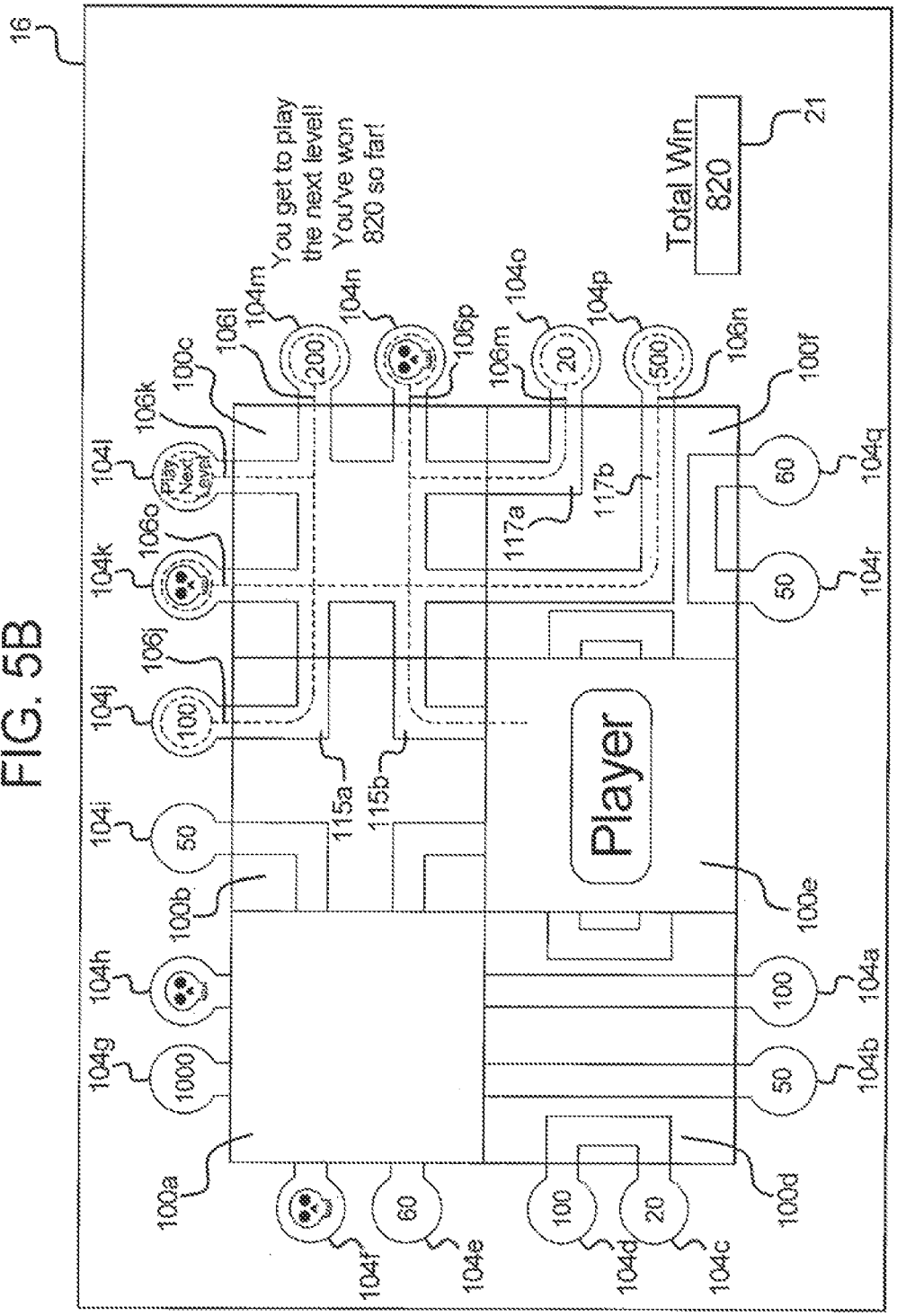

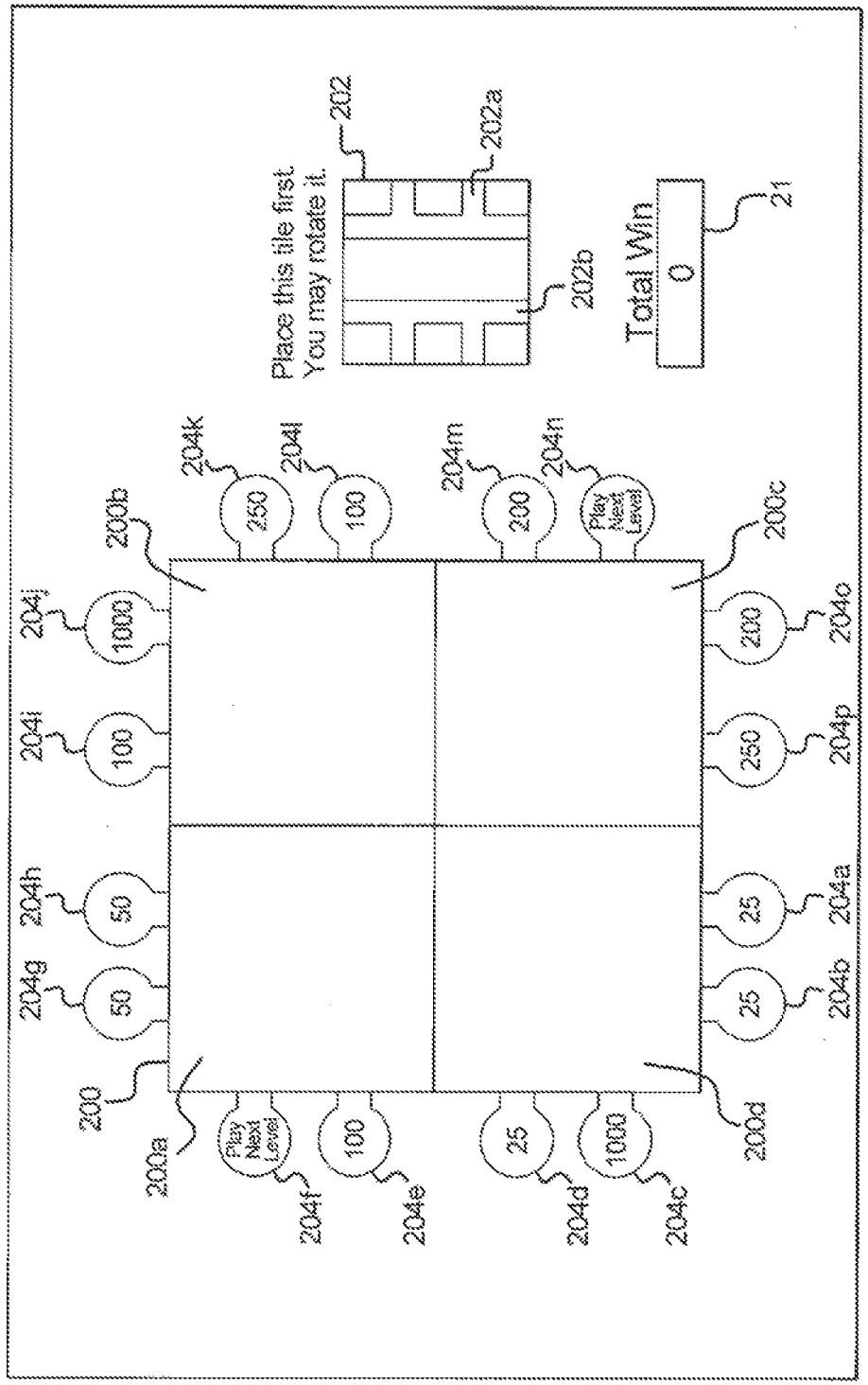

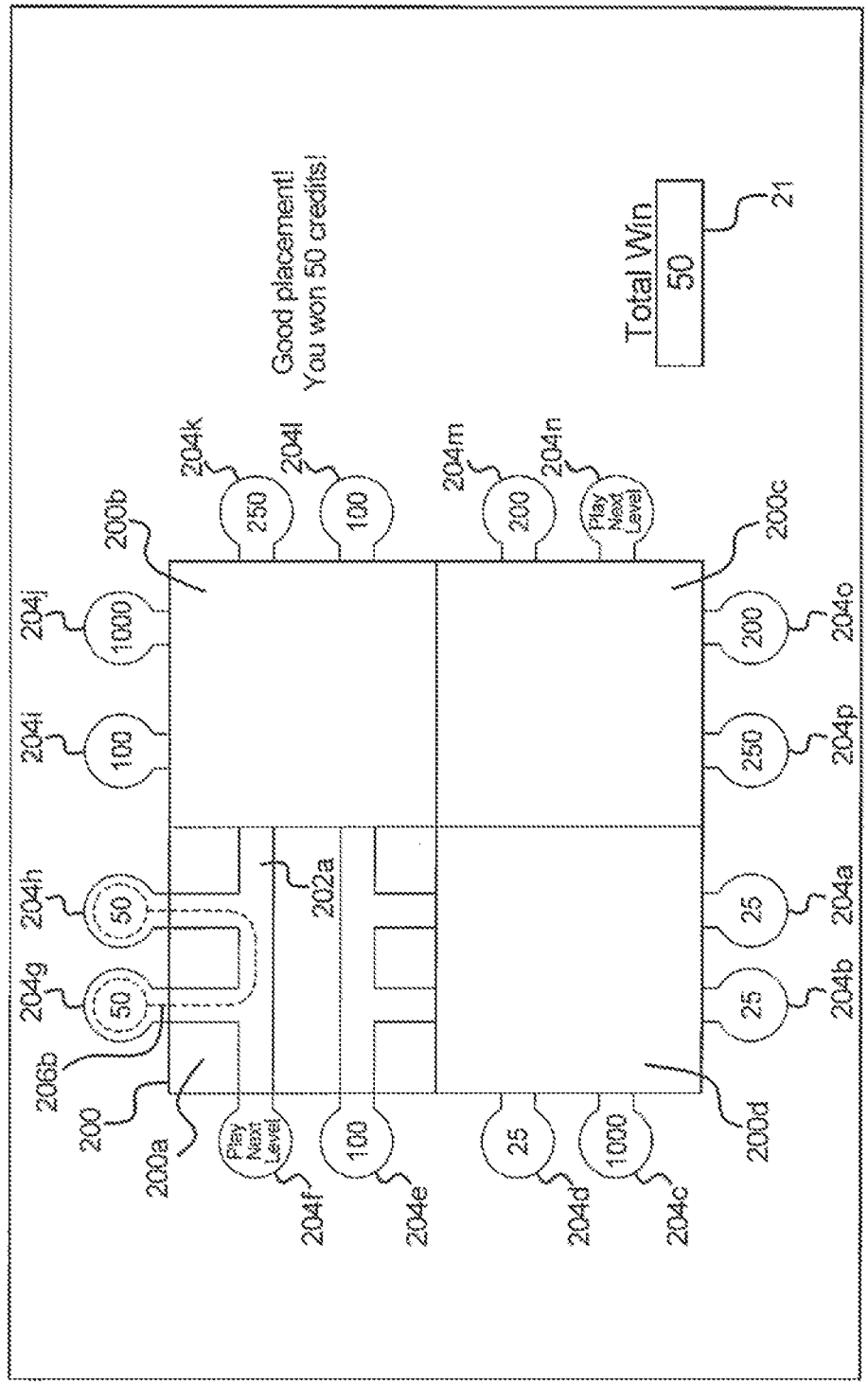

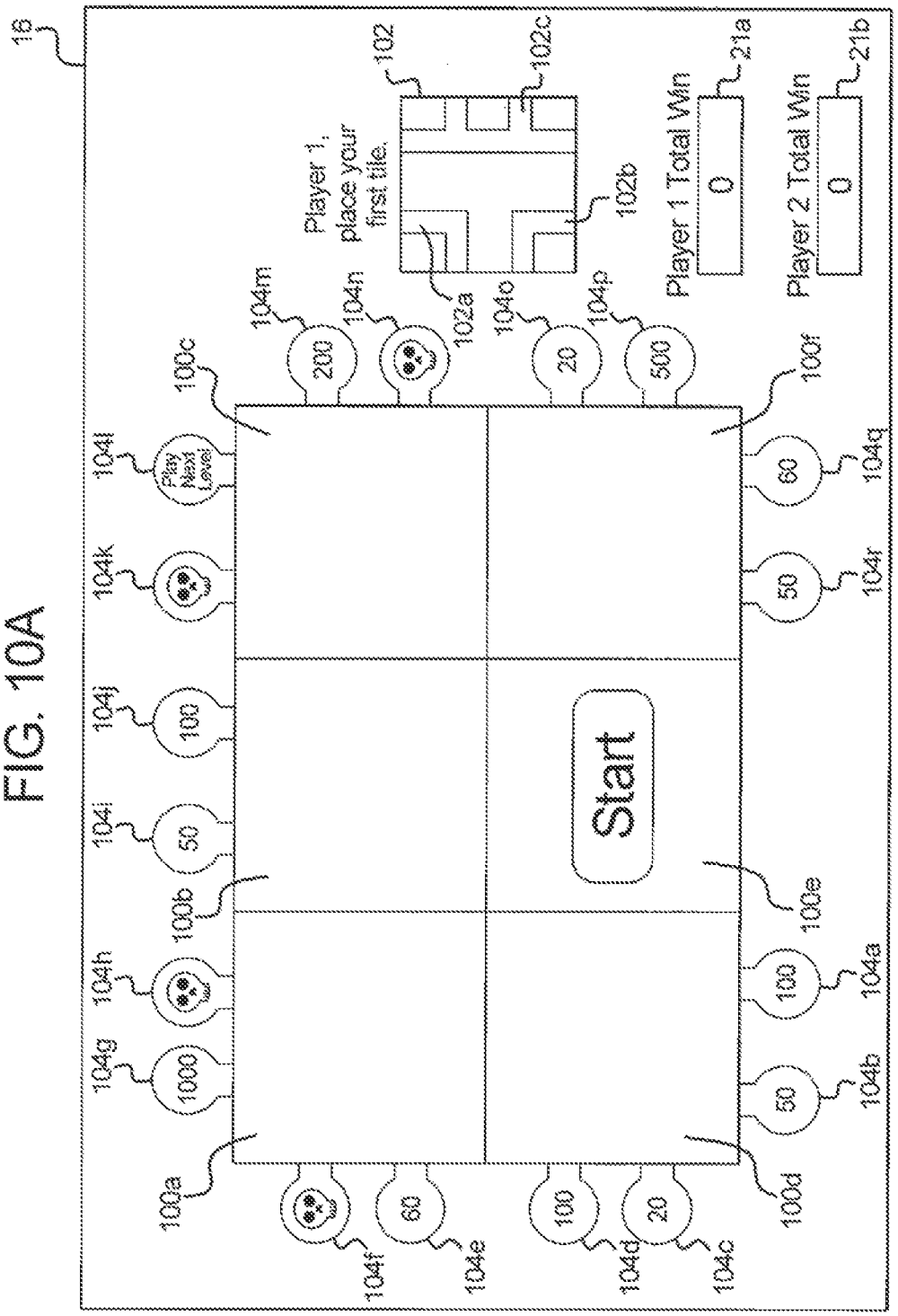

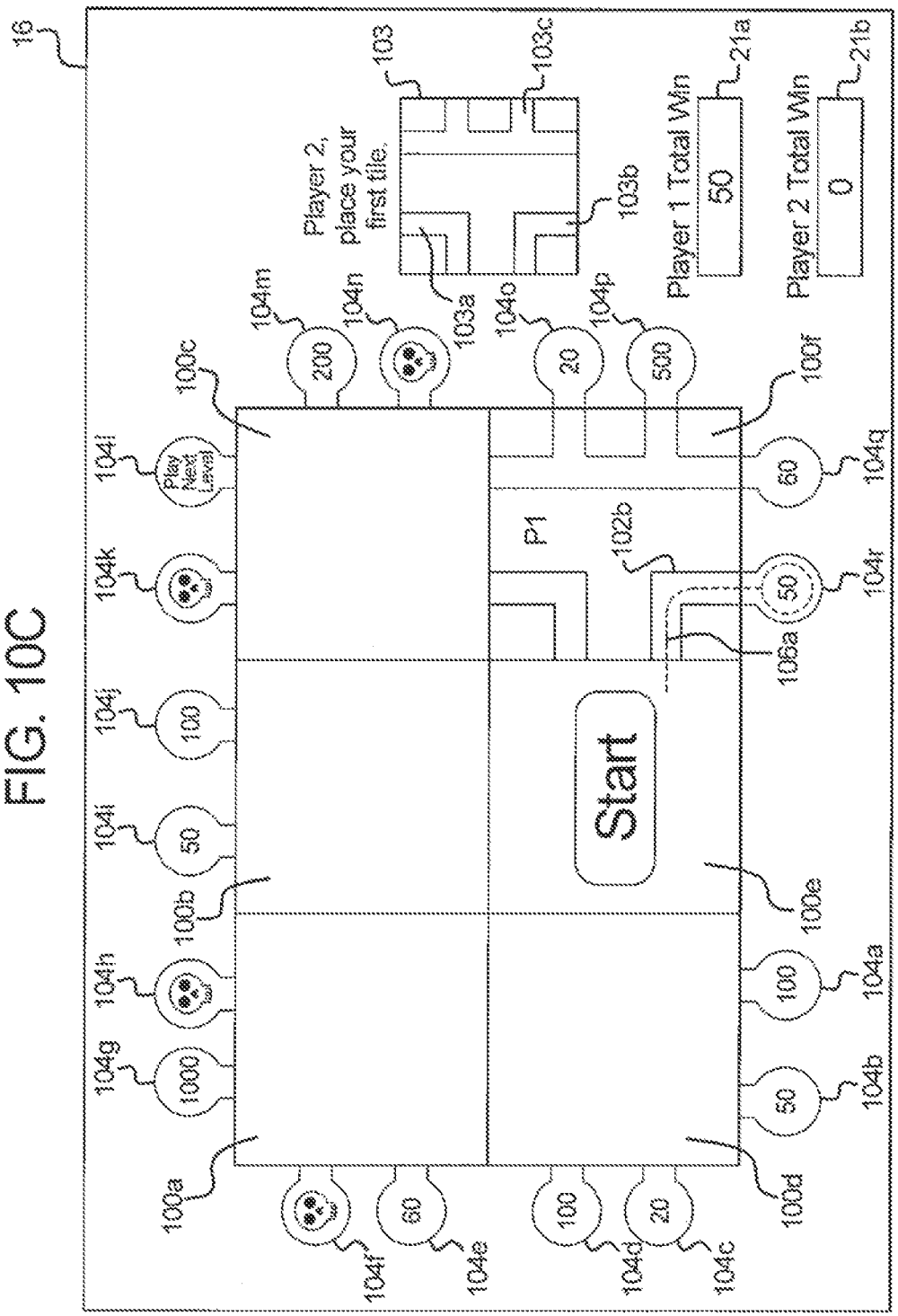

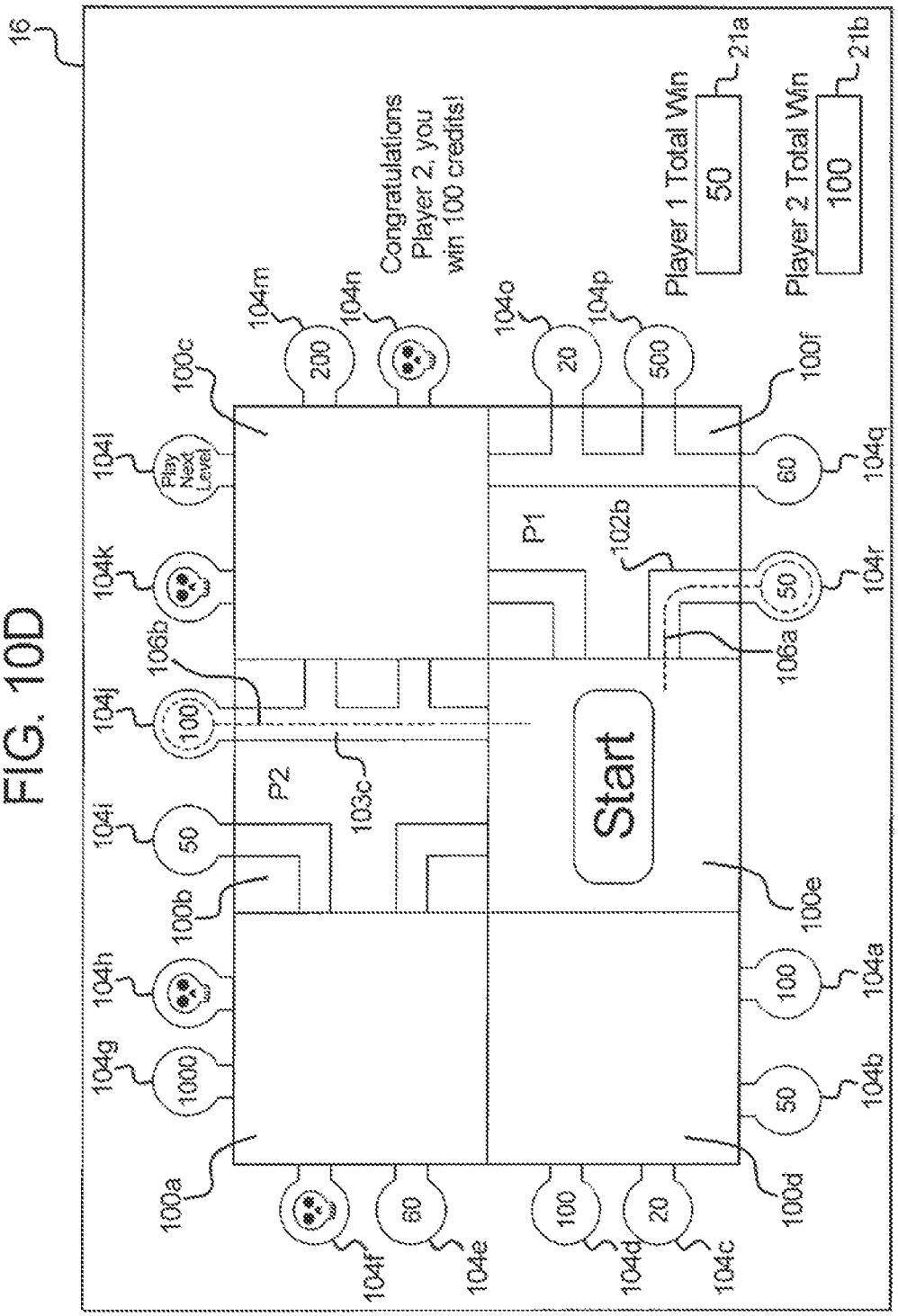

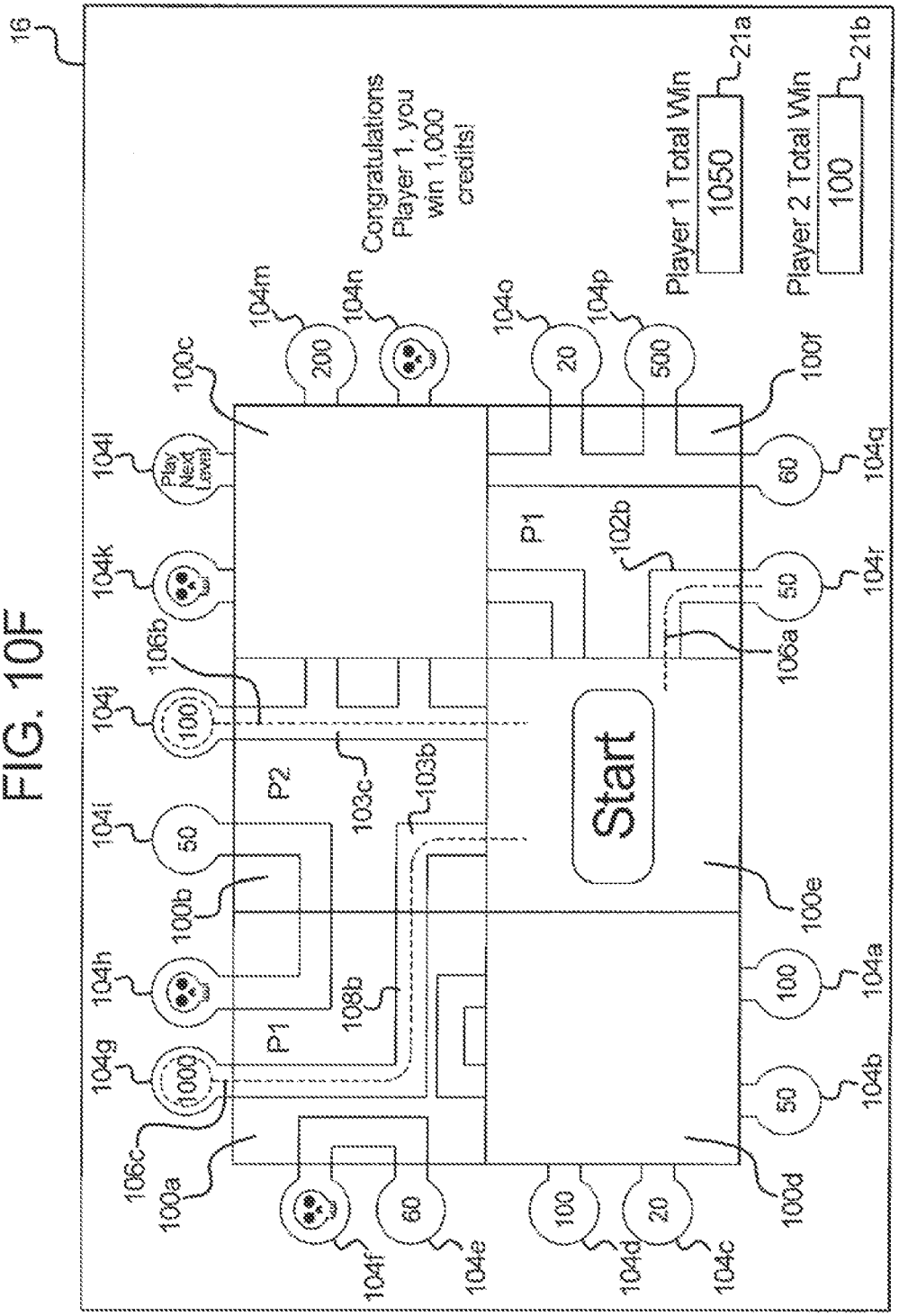

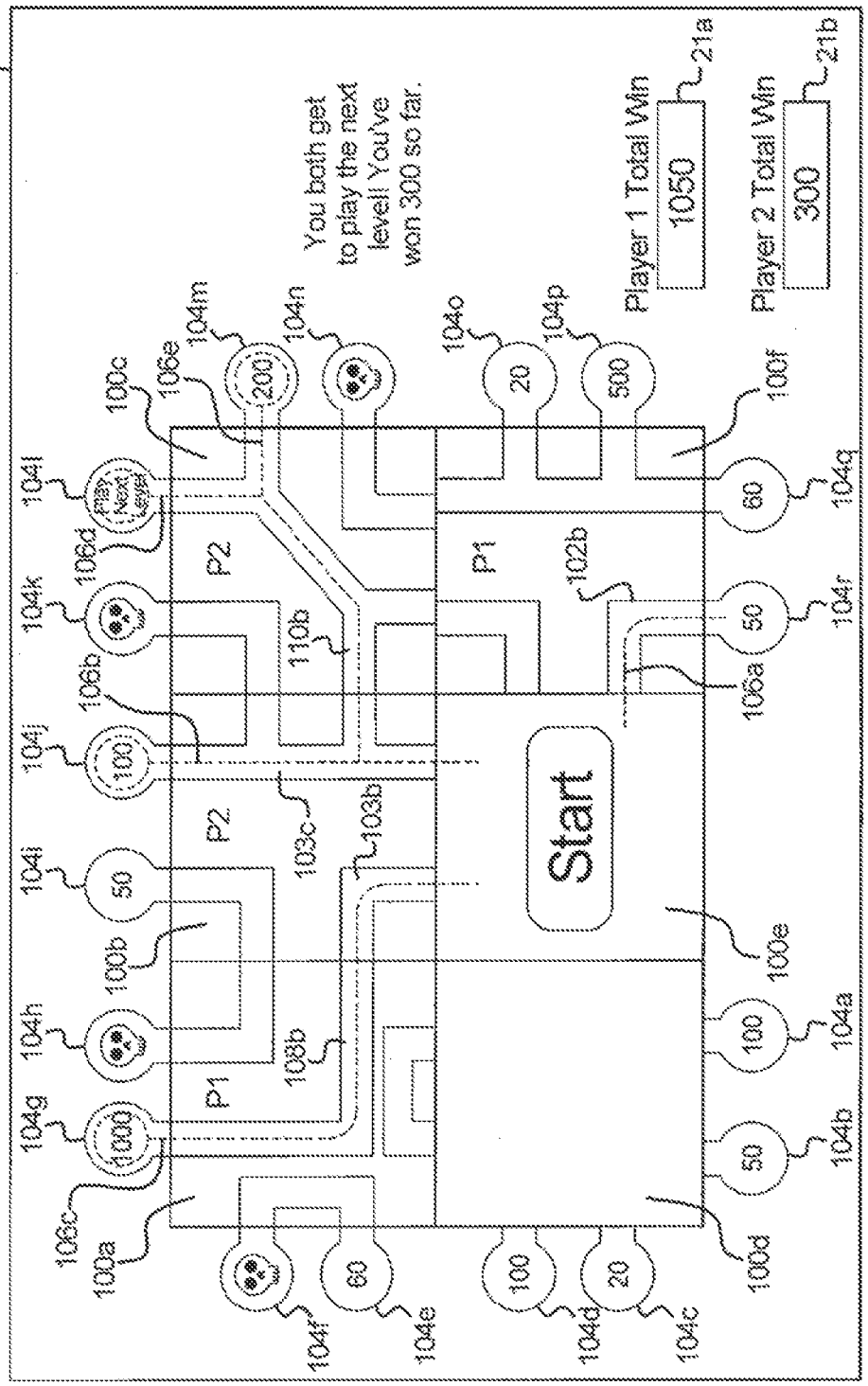

GAMING SYSTEM AND METHOD FOR PROVIDING A CASUAL WAGERING GAME

PRIORITY CLAIM

This application is a continuation of, and claims priority to and the benefit of, U.S. patent application Ser. No. 12/541,649, filed on Aug. 14, 2009, the entire contents of which are incorporated herein by reference.

BACKGROUND

Casual games are a well known phenomena, especially on the world wide web. Casual games, characterized by their simple rules, generally require no long-term time commitment or special skills to play, in contrast to more complex video games. An example of a casual game is a simple puzzle game which is played using a single input device on a handheld device or personal computer. Such casual games often enable a player to play one or more levels in a relatively short increment of time.

Due to their simplicity and convenience, casual games generally appeal to a wide demographic of players including both older and younger players, "tech savvy" and less "tech savvy" players and male and female players. In particular, many casual games appeal to demographics which are generally not as interested in more complex video games, such as older players and women.

One known popular casual game is the BEJEWELED® game. BEJEWELED® is a registered trademark of PopCap Games, Inc. The general objective of the BEJEWELED® game is to swap one gem symbol with an adjacent gem symbol to form a horizontal or vertical chain of three or more gem symbols. If a horizontal or vertical chain of three or more gem symbols is formed, the gem symbols in the chain disappear. After the gem symbols in the chain disappear, gem symbols fall from the top of a game display to fill in spaces left by the gem symbols that have disappeared. Sometimes, chain reactions called cascades are triggered, where chains are formed by the falling gem symbols. During these cascades, one or more gem symbols that fall from the top of the game display form chains of three or more gem symbols with one or more prexisting gem symbols. In other words, chains of gem symbols are formed during cascades with no player action.

Based on the popularity of casual games, certain casual games have been transformed into wagering games. For example, IGT's popular video slot series sold under the trademark DA VINCI DIAMONDS® includes a TUMBLING REELS® feature, wherein symbols that are part of winning symbol combinations disappear and new symbols drop in sequence into the game display to fill the empty positions. DA VINCI DIAMONDS® and TUMBLING REELS® are registered trademarks of IGT Corporation.

Given the growing popularity of casual games and the apparent appeal of casual game themes in wagering games, a need exists for new gaming systems and methods for providing casual wagering games which will appeal to players who enjoy casual games, along with other players.

SUMMARY

Various embodiments of the disclosed gaming system, gaming device and method provide a casual wagering game having a matrix having a plurality of positions including a starting position or cell. In various embodiments, a plurality of path endpoints are positioned along a perimeter of the matrix, and each of the path endpoints are associated with one of: (a) an award; (b) a symbol indicating advancement to a subsequent level; (c) a terminator symbol, which ends game play; and (d) another suitable function. Each position of the matrix, except the starting position, is configured to accommodate one of a plurality of tiles, which each include one or a plurality of path segments.

When the tiles are placed in certain configurations at the positions or cells of the matrix, path segments of bordering tiles form a complete path between the starting position and one or more of the path endpoints. The general objective of the game is for a player to place tiles at or in the positions in the matrix such that connecting path segments form a complete path between the starting position or cell and one or more path endpoints.

In one example, for a play of the game, a display device displays the matrix and indicates the starting position. The display device displays a tile including a plurality of path segments. The gaming system then enables the player to place the displayed tile at one of the positions or cells using an input device.

After the player has placed the tile, the gaming system determines if a complete path is formed between the starting position and one or more of the path endpoints positioned about the perimeter of the matrix.

If the gaming system determines that a complete path is not formed, the display device displays another tile and the player is enabled to place that tile at one of the positions using the input device.

In one embodiment, if the gaming system determines that a complete path is formed between the starting position and a path endpoint associated with a terminator symbol, the game ends. If the gaming system determines that a complete path is formed between the starting position and a path endpoint associated with an award, the gaming system provides the player with the award and the game continues. If the gaming system determines that a complete path is formed between the starting position and a symbol indicating advancement to a subsequent level, the player advances to the subsequent level.

This new casual wagering game provides a new and exciting gaming experience for both existing players of wagering games, and existing casual game players which are new to wagering games. Further, the casual wagering game disclosed herein provides a new and exciting improvement on existing wagering selection games, providing players of various skill levels the excitement and entertainment of a skill component and the opportunity to advance to multiple levels.

In various embodiments, any of the casual wagering games disclosed herein may be a primary game or a bonus game. Additionally, in various embodiments, any of the casual wagering games disclosed herein may be offered in a multi-player configuration.

Additional features and advantages are described herein, and will be apparent from, the following Detailed Description and the figures.

BRIEF DESCRIPTION OF THE FIGURES

FIG. 2A is a schematic block diagram of the electronic configuration of one embodiment of a gaming device disclosed herein.

FIG. 2B is a schematic diagram of the central controller in communication with a plurality of gaming devices in accordance with one embodiment of the gaming system disclosed herein.

FIGS. 3A, 3B, 3C, 3D, 3E, 3F, 3G and 3H are front views of a display of a gaming device enabling a play of one embodiment of the casual wagering game disclosed herein.

FIGS. 4A, 4B and 4C are front views of a display of a gaming device enabling a play of one embodiment of the casual wagering game disclosed herein.

FIGS. 5A and 5B are front views of a display of a gaming device enabling a play of one embodiment of the casual wagering game disclosed herein.

FIGS. 6A and 6B are front views of a display of a gaming device enabling a play of one embodiment of the casual wagering game disclosed herein.

FIGS. 10A, 10B, 10C, 10D, 10E, 10F, 10G and 10H are front views of a display of a gaming device enabling a play of one multi-player embodiment of the casual wagering game disclosed herein.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
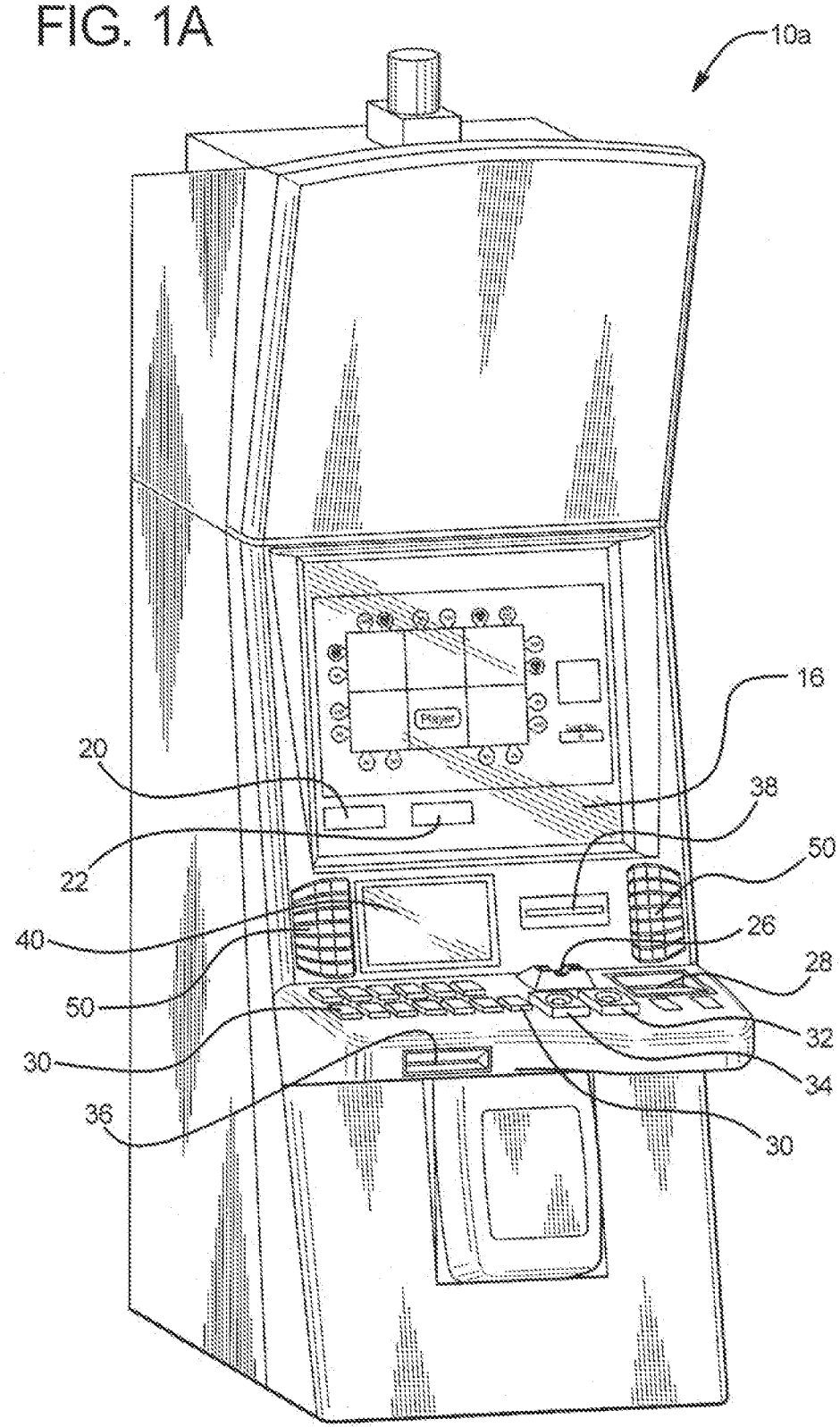
FIGS. 1A and 1B are front perspective views of alternative embodiments of gaming devices disclosed herein.
Figure 1B:
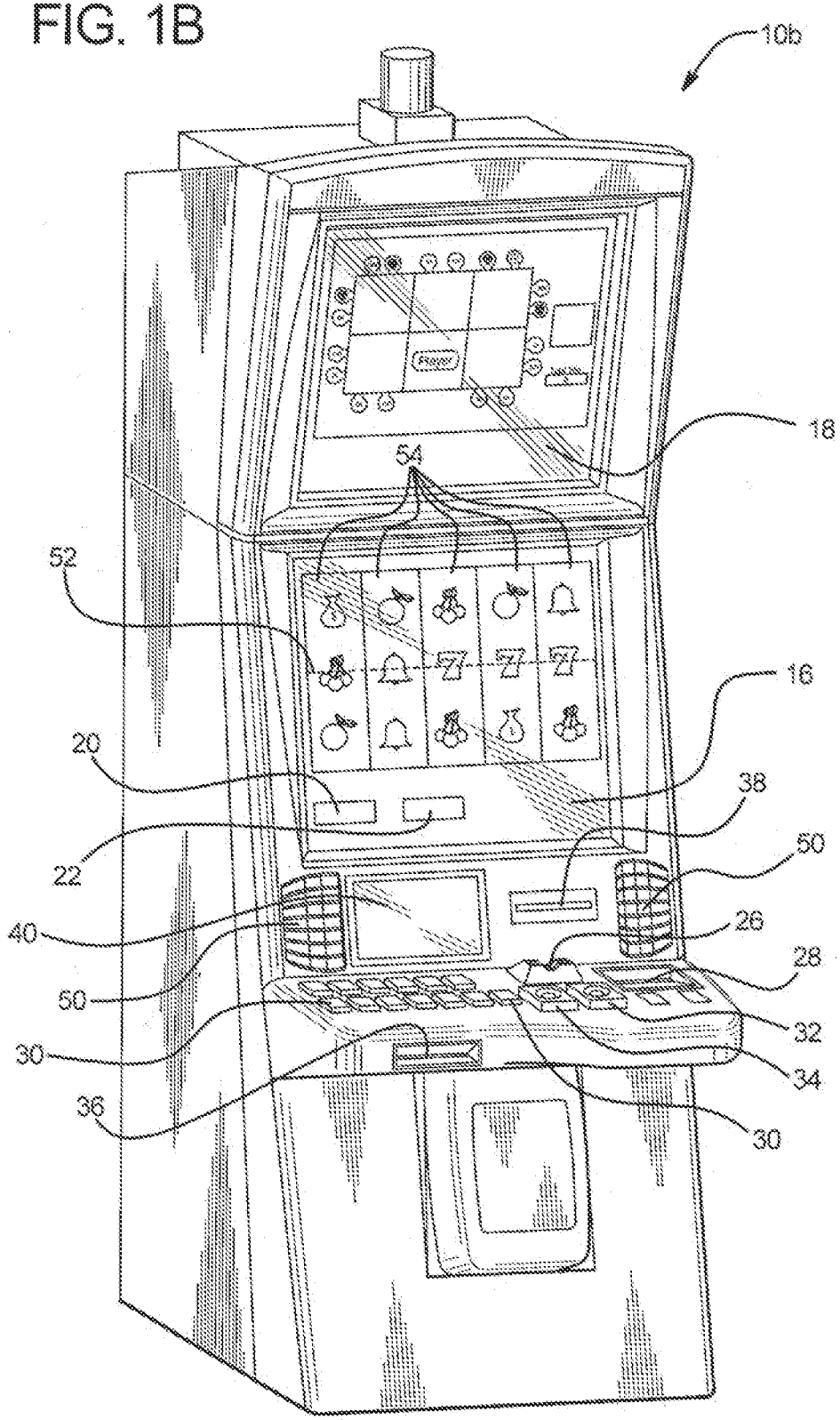

Referring now to the drawings, two example alternative embodiments of a gaming device disclosed herein are illustrated in FIGS. 1A and 1B as gaming device 10a and gaming device 10b, respectively. Gaming device 10a and/or gaming device 10b are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, the bingo game is a base game and the casual wagering game disclosed herein is a bonus game. It should be appreciated that in various other embodiments, the casual wagering game disclosed herein may be a base game and the bingo game may be a bonus game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round, such as the casual wagering game disclosed herein. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game. In embodiments including a bingo, keno or lottery game, either the bingo, keno or lottery game is a base game and the casual wagering game disclosed herein is a bonus game or the bingo, keno or lottery game is a bonus game and the casual wagering game disclosed herein is a base game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an Internet or intranet. In this embodiment, the operation of the gaming device can be viewed at the gaming device with at least one Internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an Internet game page from any location where an Internet connection and computer or other Internet facilitator is available. The expansion in the number of computers and number and speed of Internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Casual Wagering Games

Various embodiments of the disclosed gaming system and method include a casual wagering game. Referring now to FIG. 3A, in one embodiment, the game includes a matrix 100 having a plurality of positions or cells 100a, 100b, 100c, 100d, 100e and 100f. It should be appreciated that in various embodiments, the matrix 100 may include any suitable number of positions or cells as further discussed below.

A plurality of path endpoints 104a, 104b, 104c, 104d, 104e, 104f, 104g, 104h, 104i, 104j, 104k, 104l, 104m, 104n, 104o, 104p, 104q and 104r are positioned along a perimeter of the matrix 100. It should be appreciated that in various embodiments, the perimeter may be an outer perimeter (e.g., the perimeter defined by the outer most borders of the matrix), an inner perimeter (e.g., a perimeter defined at least in part within the matrix) or a mix thereof. In this example embodiment, each of the path endpoints are associated with one of: (a) an award; (b) a symbol indicating advancement to a subsequent level; or (c) a terminator symbol, which ends game play. Specifically, referring to FIG. 1A, path endpoints 104a, 104b, 104c, 104d, 104e, 104g, 104i, 104j, 104k, 104m, 104o, 104p, 104q and 104r are each associated with an award comprising an amount of credits; path endpoints 104f, 104h, 104k and 104n are each associated with a skull symbol which terminates game play; and path endpoint 104l is associated with a symbol indicating the player advances to a subsequent level. It should be appreciated that in various other embodiments, any of the path endpoints may be associated with any other suitable function or outcome. It should also be appreciated that a terminator symbol and a symbol indicating advancement to a next level of play may be any suitable symbol. Additionally, it should be appreciated that in various embodiments, an award associated with a path endpoint may be a multiplier, a physical prize, a free play, a free spin in a reel game or any suitable award.

In this embodiment, position 100e is a starting position and each position or cell of the matrix 100, except the starting position 100e, is configured to accommodate or receive one of a plurality of tiles, for example, tile 102 in FIG. 3A. In this example, each tile of the plurality of tiles includes a plurality of path segments. For example, tile 102 includes path segments 102a, 102b and 102c. However, it should be appreciated that in various other embodiments, one or more tiles may include one or a plurality of path segments. It should also be appreciated that in various embodiments, for a play of the game, the plurality of tiles may each include the same number of path segments or one or more of the plurality of tiles may include a different number of path segments.

The general objective of the game in this embodiment is for a player to place tiles, beginning with tile 102 in FIG. 3A, at positions in the matrix 100 such that connecting path segments form a complete path between the starting position 102e and one or more desired path endpoints.

In this embodiment, the game is a bonus game which is triggered upon the occurrence of a designated triggering event in a base game. In various other embodiments, the designated triggering event may be any of: (a) the generation of a designated symbol or combination of symbols; (b) the passage of a predetermined amount of time; (c) the placement of a designated wager; (d) a designated number of wins; (e) a designated number of losses; and (f) any other suitable event. It should be appreciated that any of the embodiments of the game disclosed herein may also be a base game.

Referring back to FIG. 3A, the gaming system displays the tile 102 and the path segments 102a, 102b and 102c of the tile 102 and instructs the player to place tile 102 at one of the positions of the matrix 100. It should be appreciated that in this embodiment, the display is a touch screen and the player places a tile at a position by "dragging and dropping" the tile. It should be appreciated that in various embodiments, the player may be enabled to place tiles using any suitable input device. It should also be appreciated that in various alternative embodiments, the processor selects a position at which to place at least one tile. In various such embodiments, for at least one tile, the processor: (a) automatically selects a position for the tile; (b) selects a position for the tile if the player has not selected a position for the tile within a designated amount of time; (c) selects a position for the tile upon the player's selection of an input device requesting the processor to select a position; (d) randomly selects a position for the tile; or (e) selects a position for the tile in a predetermined manner. In various such embodiments, the processor may place less than or all of the plurality of the tiles.

It should be appreciated that in various embodiments, the player is instructed to place the displayed tile at a position bordering the starting position or bordering a prior-placed tile (in other words, build from the starting position). In various other embodiments, the gaming system enables a player to place the displayed tile at any position of the matrix, regardless of its orientation relative to the starting position. It should be appreciated that in other embodiments, the matrix does not include a starting position prior to a player's first tile placement and the player defines the starting position for any resulting path by placement of their first tile.

In this embodiment, the gaming system does not enable the player to rotate tiles prior to placing them at a position in the matrix 100. However, it should be appreciated that in various other embodiments, the gaming system enables the player to rotate one or more of the tiles prior to placing them at a position in the matrix 100.

It should be appreciated that although in FIG. 3A the gaming device displays the tile 102 and each of its path segments to the player, in various other embodiments, the gaming device may: (a) display the tile, but not display the path segments of the tile until a position is selected for the tile or (b) display the tile, but display less than all of the path segments of the tile until a position is selected for the tile.

As illustrated in FIG. 3B, the player placed tile 102 at position 100f. After the player has placed the tile 102, the gaming system determines if a complete path is formed between the starting position 102e and one or more of the path endpoints positioned about the perimeter of the matrix 100.

If the gaming system determines that a complete path is not formed, the display device displays another tile and the player is enabled to place the tile at one of the positions bordering the starting position 100e or one of the positions bordering the 102.

If the gaming system determines that a complete path is formed between the starting position 100e and a path endpoint associated with a terminator symbol, the game ends.

If the gaming system determines that a complete path is formed between the starting position 100e and a symbol indicating advancement to a subsequent level, the player advances to the subsequent level. In various embodiments, higher levels are associated with higher awards. It should also be appreciated that in various embodiments, path endpoints associated with advancement to a next level could also be associated with an award which is provided to player.

If the gaming system determines that a complete path is formed between the starting position 100e and a path endpoint associated with an award, the gaming system provides the player with the award and the game continues. Referring to FIG. 3B, in this example, a complete path 106a is formed from the starting position 100e to path endpoint 104r by path segment 102b of tile 102. Path endpoint 104r is associated with an award of 50 credits which is provided to the player as indicated in Total Win display 21 in FIG. 3B. It should be appreciated that in various other embodiments, play of the game may end when the player receives a first award. This would create a different element of strategy, as the player may purposely place a tile in a non-award winning position to hold out for a larger award.

FIG. 3C illustrates an alternative scenario to that of FIG. 3B, in which the player placed tile 102 at position 100b. Referring to FIG. 3C, in this example, a complete path 106b is formed from the starting position 100e to path endpoint 104j by path segment 102c of tile 102. Path endpoint 104j is associated with an award of 100 credits which is provided to the player as indicated in Total Win display 21 in FIG. 3C.

Figure 3E:
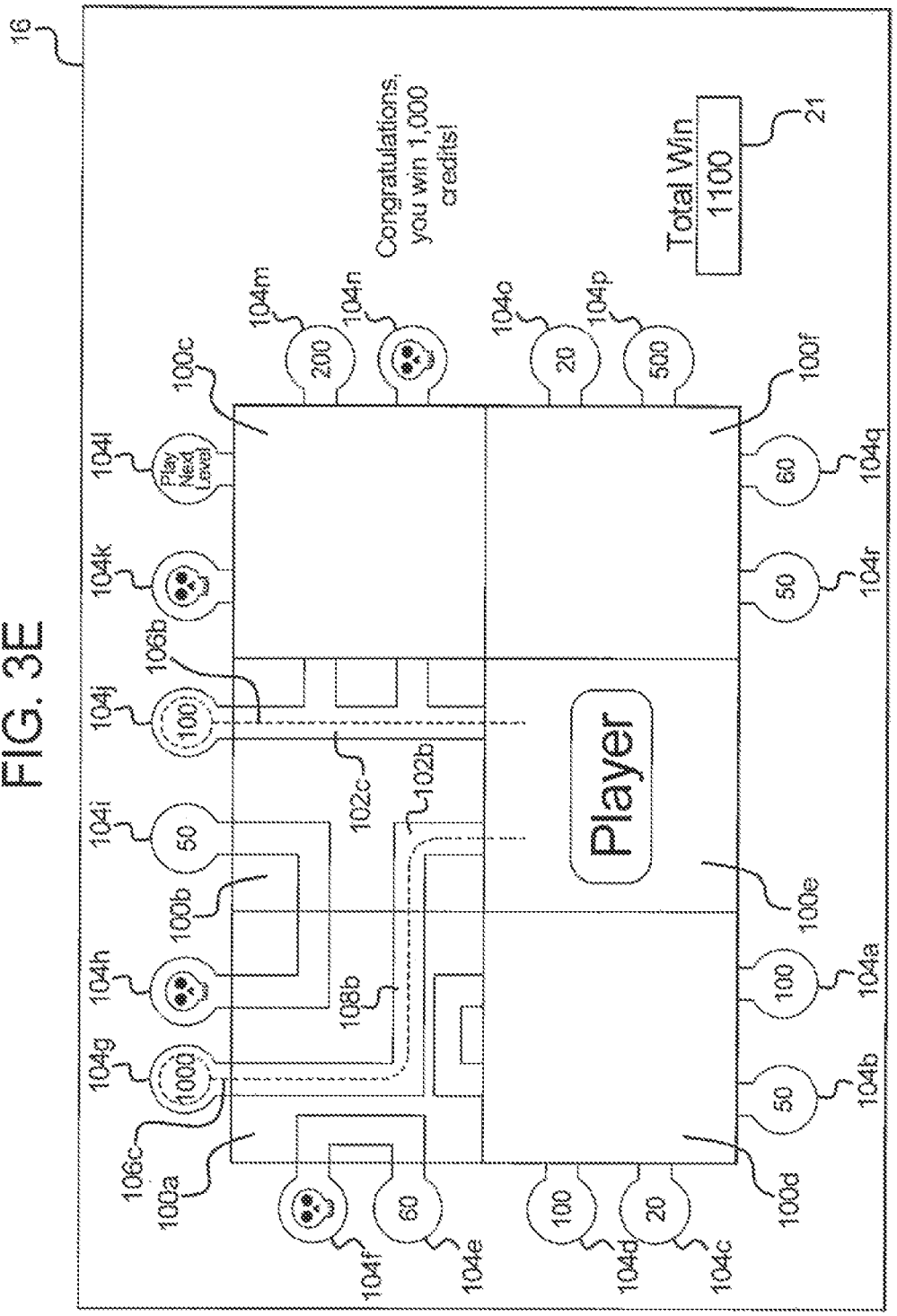

Play of the game continues from the play illustrated in FIG. 3C. As illustrated in FIG. 3D, the gaming system instructs the player to place tile 108, which includes path segments 108a, 108b, 108c and 108d. The player placed tile 108 at position 100a, as illustrated in FIG. 3E. Referring to FIG. 3E, in this example, a complete path 106c is formed from the starting position 100e to path endpoint 104g by path segment 102b of tile 102 and 108b of tile 108. Path endpoint 104g is associated with an award of 1000 credits which is provided to the player as indicated in Total Win display 21 in FIG. 3E.

Figure 3F:
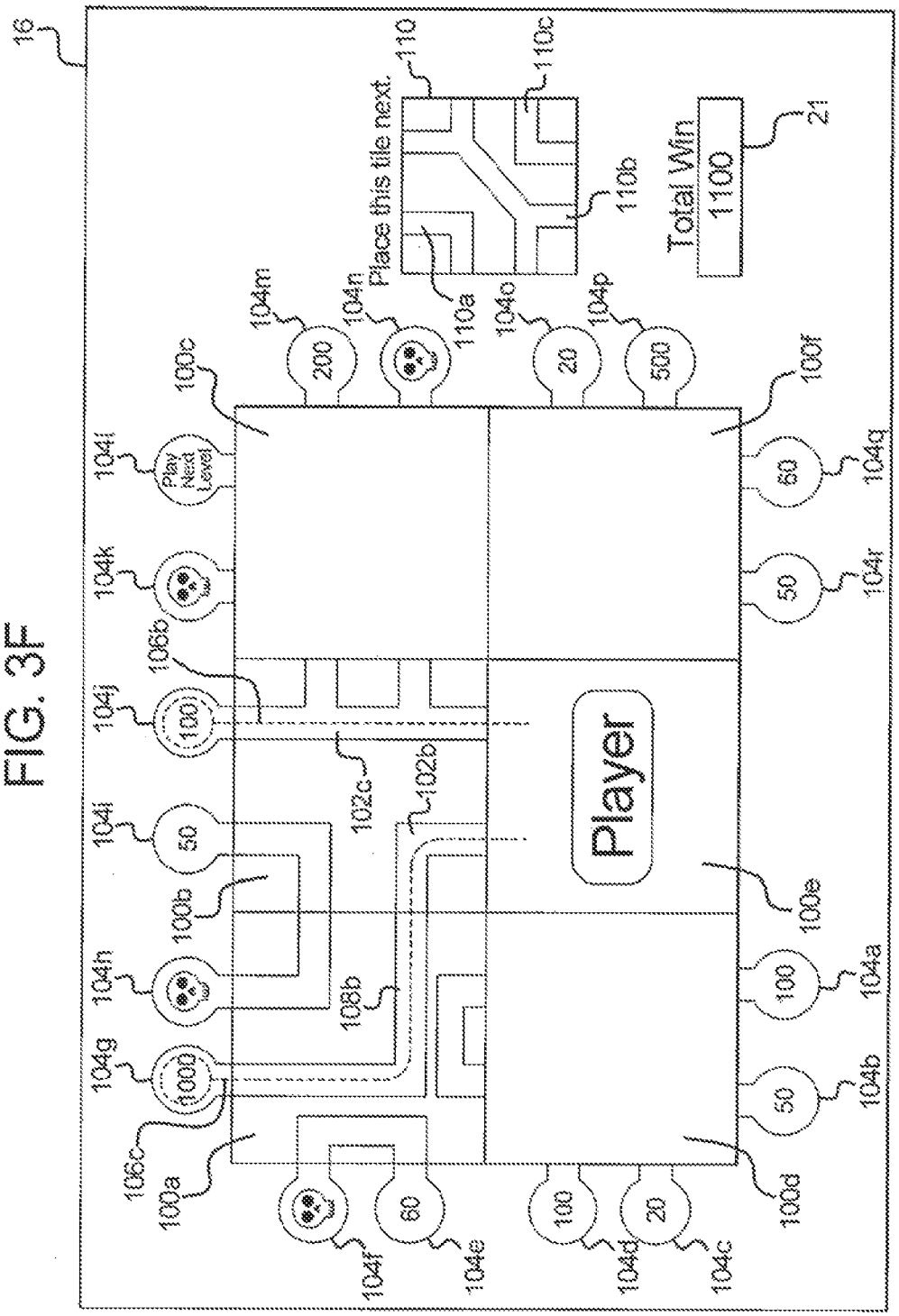

Referring to FIG. 3F, the gaming system next instructs the player to place tile 110, which includes path segments 110a, 110b and 110c, at a position in matrix 100. In various embodiments, a complete path can connect to two or more path endpoints either via branches of the same path segment or different respective path segments. For example, referring to FIG. 3F, path segment 110b of tile 10 would be able to complete a path with two path endpoints.

In various embodiments in which a complete path is formed with two path endpoints via the same tile placement, one path endpoint could be associated with a terminator symbol and another path endpoint could be associated with an award. In one such embodiment, the game ends and the gaming system does not provide the player with the award. In another such embodiment, although the game ends as a result of the terminator symbol, the gaming system still provides the player with the award.

In various other embodiments in which a complete path is formed with two path endpoints via the same tile placement, both path endpoints could be associated with an award. In one such embodiment, the gaming system provides the player with both awards. In another such embodiment, the gaming system provides the player with the lower of the awards. In another such embodiment, the gaming system provides the player with the highest of the awards.

In various other embodiments in which a complete path is formed with two path endpoints via the same tile placement, one path endpoint could be associated with an advancement to a subsequent level and another path endpoint could be associated with an award. In one such embodiment, the gaming system provides the player with the award and the player advances to the subsequent level. In another such embodiment, the gaming system advances the player to the subsequent level, but does not provide the player with the award.

In various other embodiments in which a complete path is formed with two path endpoints via the same tile placement, one path endpoint could be associated with an advancement to a subsequent level and another path endpoint could be associated with a terminator symbol. In one such embodiment, the gaming system still advances the player to the subsequent level. In another such embodiment, the gaming system terminates play of the game.

In various other embodiments in which a complete path is formed between two path endpoints via the same tile placement, one path endpoint could be associated with an award and another path endpoint could be associated with a terminator symbol. In one such embodiment, the gaming system still provides the player with the award before terminating the game. In another such embodiment, the gaming system terminates play of the game and does not provide the player with the award.

Referring now to FIG. 3G, the player placed tile 110 at position 100c. Referring to FIG. 3G, in this example, a complete path 106d is formed from the starting position 100e to path endpoint 104l by path segment 102c of tile 102 and path segment 110b of tile 110. Additionally, a complete path 106e is formed from the starting position 100e to path endpoint 104m by path segment 102c of tile 102 and path segment 110b of tile 110. Path endpoint 104l is associated with advancement to a next level and path endpoint 104m is associated with an award of 200 credits. In this embodiment, the player both receives the award of 200 credits and advances to the next level as indicated in FIGS. 3G and 3H. In the next level, the gaming system next instructs the player to place tile 112, which includes path segments 112a, 112b and 112c, at a position in matrix 100. As illustrated in FIG. 3H, in this embodiment, the awards associated with certain path endpoints are higher in the next round than in the first round. For example, referring to FIG. 3G, in the first round, path endpoint 104g is associated with an award of 1,000 credits. Referring back to FIG. 3H, in the next round, path endpoint 104g is associated with an award of 2,000 credits.

In various other embodiments, a next round or level may differ in other ways. For example, in various embodiments, the next level may include one or more of: (a) a different ratio of terminating symbols to award symbols; (b) a different distribution of awards, but with a same average award value; (c) more or less grid positions; (d) a different grid configuration (e.g., the location of the positions relative to one another); (e) a different distribution of tiles (i.e., different tiles or the tiles being displayed for placement in a different order); and (f) the same symbols, at least two of which are associated with a different path endpoint.

In various embodiments, the gaming system assists the player during game play. The gaming system may assist the player in one or more of the following ways: (a) providing an audio tip regarding tile placement strategy; (b) recommending a particular matrix position for tile placement by emphasizing a certain position by highlighting its border or highlighting the position itself (e.g., by a colored background); (c) displaying a visual warning or tile placement tip; (d) providing the player with a wild tile for placement (e.g., one which connects path segments in all directions); and (e) assisting the player in any other suitable manner.

It should be appreciated that in various embodiments, jurisdiction permitting, the gaming system detects the level of play of the player and provides the player with assistance if it detects the player is playing poorly. In various other embodiments, the gaming system provides the player with assistance: (a) randomly; (b) for a designated number of rounds of play of a game; (c) for an additional wager; (d) if the gaming system detects that the player has not placed a tile for a designated amount of time; (e) based on a player's status as defined by a player tracking card; or (f) under any other suitable circumstances.

Figure 4A:
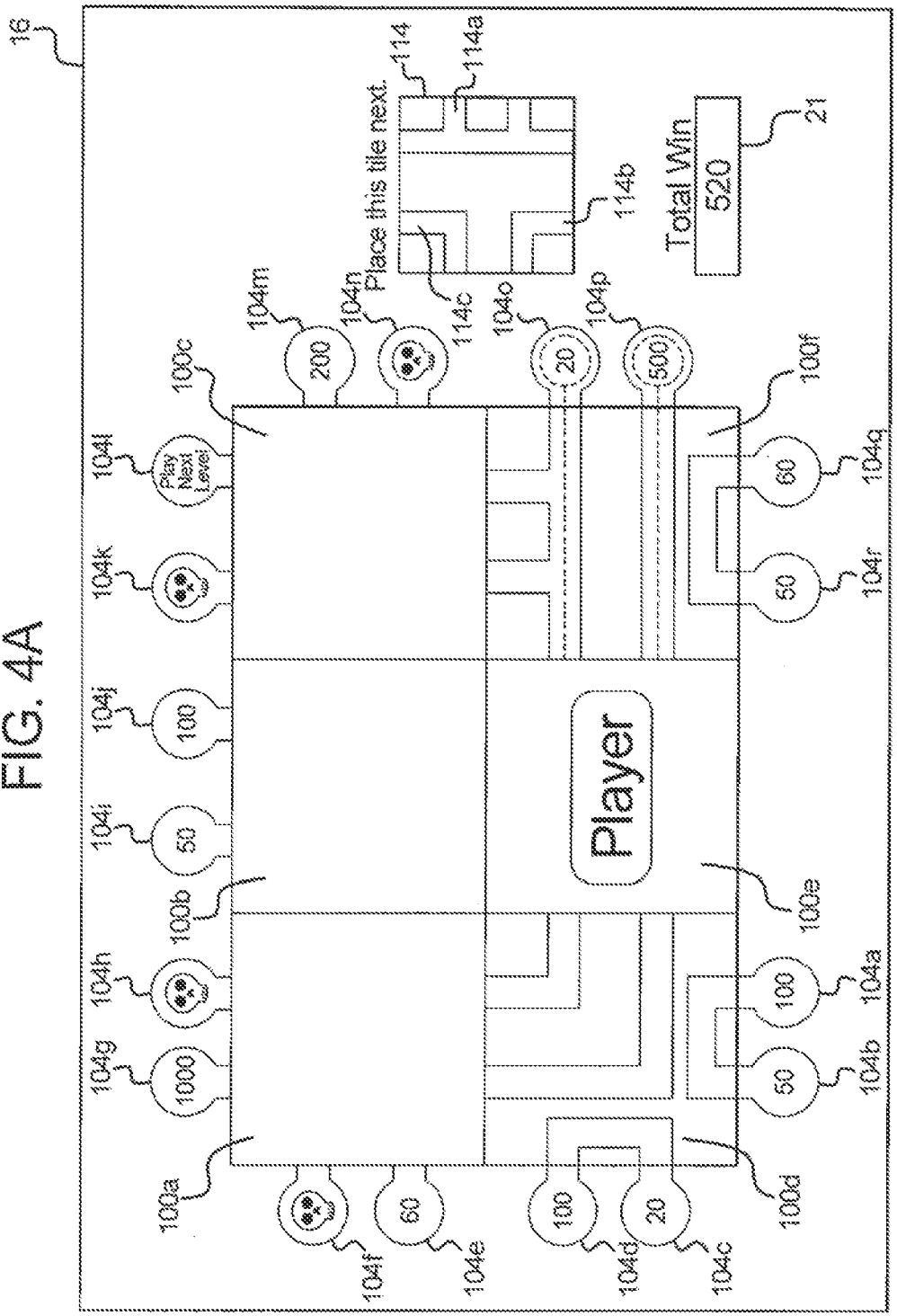
Figure 4B:
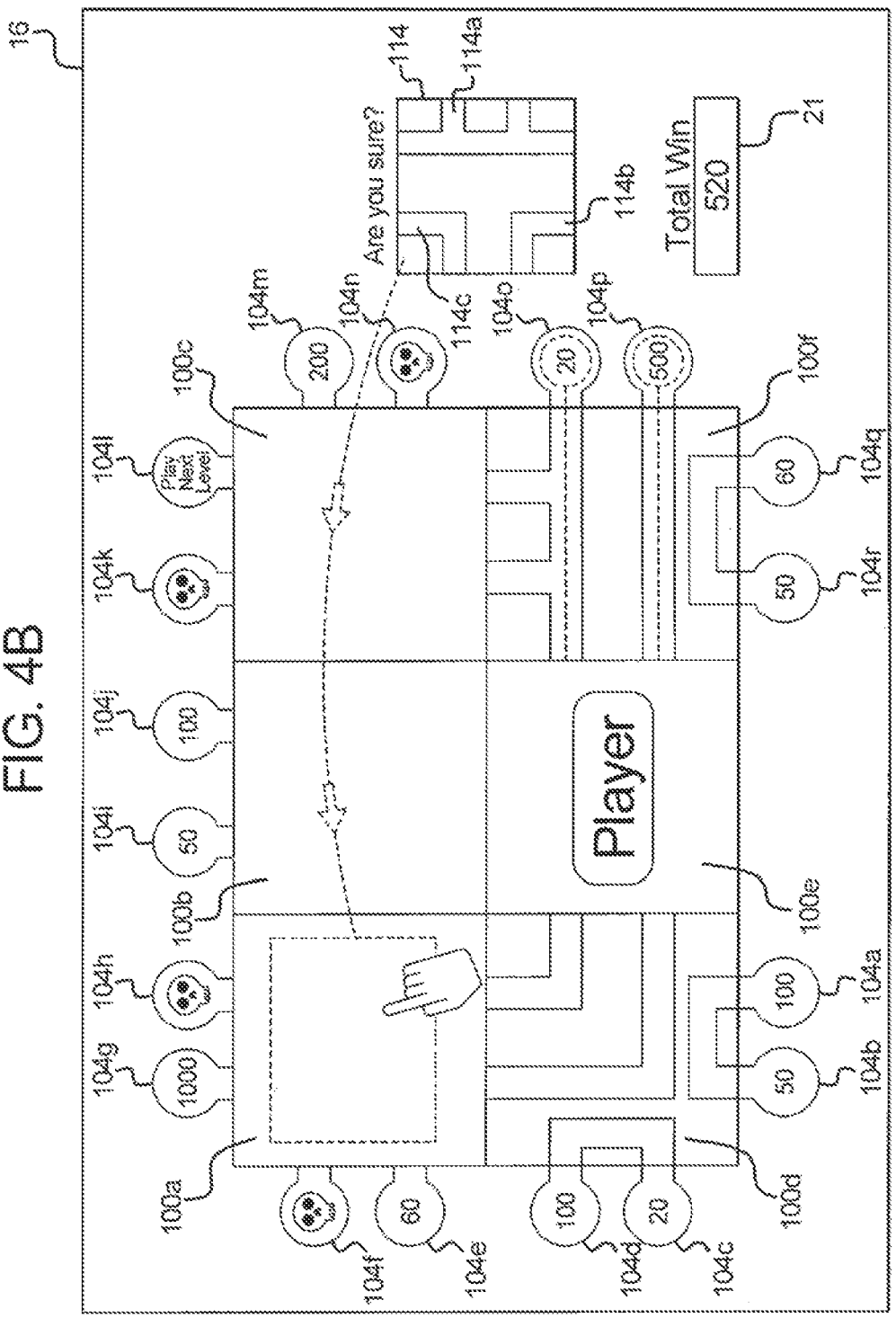

For example, referring to FIG. 4A, which illustrates a play of the game in progress, the gaming system instructs the player to place tile 114, which includes path segments 114a, 114b and 114c. The player attempts to place tile 114 at position 100a, as illustrated in FIG. 4B. In this example, the gaming system displays the text, "Are you sure?," to attempt to warn the player that by placing tile 114 at position 100a the game will end, as a complete path would be formed to path endpoint 104h, which is associated with a terminator symbol. In this embodiment, the warning text is displayed when the player drags tile 114 over position 100a, but before the player releases tile 114 (e.g., by removing their finger from a touch screen). It should be appreciated that in various other embodiments, such a warning may be displayed after a player places a tile, giving the player another chance to place the tile.

Referring now to FIG. 4C, after receiving the helpful warning from the gaming system, the player placed tile 114 at position 100c instead. Referring to FIG. 4C, in this example, a complete path 106i is formed from the starting position 100e to path endpoint 104l by path segment 113a and path segment 114a; a complete path 106h is formed from the starting position 100e to path endpoint 104m by path segment path segment 113a and path segment 114a; and a complete path 106g is formed from the starting position 100e to path endpoint 104n by path segment 113a and path segment 114a. Path endpoint 104l is associated with advancement to a next level, path endpoint 104m is associated with an award of 200 credits and path endpoint 104n is associated with a terminator symbol. In this embodiment, the player both receives the award of 200 credits and advances to the next level as indicated in FIG. 4C.

FIG. 5A illustrates a play of the game in progress, wherein the gaming system provides the player with a wild tile 116, which includes path segments extending in all directions. As illustrated in FIG. 5A, the gaming system instructs the player to place the tile 116 in the matrix 100. The player placed the tile 116 at position 100c, as illustrated in FIG. 3B. Referring to FIG. 5B, in this example, a complete path 106j is formed from the starting position 100e to path endpoint 104j by path segment 115a, path segment 115b and tile 116; a complete path 106o is formed from the starting position 100e to path endpoint 104k by path segment path segment 115b and tile 116; a complete path 106k is formed from starting position 100e to path endpoint 104l by path segment 115b and tile 116; a complete path 106l is formed from starting position 100e to path endpoint 104m by path segment 115b and tile 116; a complete path 106p is formed from starting position 100e to path endpoint 104n by path segment 115b and tile 116; a complete path 106m is formed from starting position 100e to path endpoint 104o by path segment 115b, tile 116 and path segment 117a; and a complete path 106n is formed from starting position 100e to path endpoint 104p by path segment 115b, tile 116 and path segment 117b. Path endpoint 104j is associated with an award of 100 credits, path endpoint 104k is associated with a terminator symbol, path endpoint 104l is associated with advancement to a next level, path endpoint 104m is associated with an award of 200 credits, path endpoint 104n is associated with a terminator symbol, path endpoint 104o is associated with an award of 20 credits and path endpoint 104p is associated with an award of 500 credits. In this embodiment, the player both receives a total award of 820 credits (the sum of the award amounts of the path endpoints associated with awards) and advances to the next level as indicated in FIG. 5B. In this embodiment, as in previously illustrated embodiments, when a path is formed between starting position 100e and a path endpoint associated with a terminator symbol at the same time as a path endpoint associated with an award or a path endpoint associated with advancement to a next level, the gaming system does not end the game.

Referring to FIGS. 6A and 6B, in another embodiment, the casual game does not include a starting position. In this embodiment, the objective of the game is for a player to connect path endpoints associated with a same symbol.

Referring to FIG. 6A, matrix 200 includes a plurality of positions 200a, 200b, 200c and 200d. It should be appreciated that in various embodiments, matrix 200 may include any suitable number of positions. Path endpoints 204a, 204b, 204c, 204d, 204e, 204f, 204g, 204h, 204i, 204j, 204k, 2041, 204m, 204n, 204o and 204p are positioned about the perimeter of matrix 200.

The gaming system instructs the player to place tile 202, which includes path segments 202a and 202b, at a position in the matrix 200, as illustrated in FIG. 6A. Additionally, in this embodiment, the gaming system instructs the player that they may rotate the tile 202 prior to placing it at a position in the matrix 200. It should be appreciated that in various other embodiments, the player is not enabled to the rotate the tile.

The player placed tile 202 at position 200a, as illustrated in FIG. 6B. Note that prior to placing tile 202 at matrix position 200a, the player rotated tile 202 ninety degrees. It should be appreciated that in embodiments in which the gaming system enables a player to rotate a tile, the gaming system may enable the player to rotate the tile in any suitable fashion. In one embodiment, the gaming system enables a player to rotate a tile by moving their finger in a circular fashion relative to the tile on a touch screen in a desired direction of rotation. In another such embodiment, the gaming system enables a player to rotate a tile by selecting an input on a touch screen independent of the display of the tile.

Path segment 206b creates a complete path between path endpoints 204g and 204h, which are both associated with an award of 50 credits. In this embodiment, the gaming system provides the player with an award if the award or symbols at the respective ends of a complete path match. Accordingly, the gaming system provides the player with an award of 50 credits, as illustrated in FIG. 6B.

In the foregoing embodiment, none of the path endpoints positioned about the perimeter of the matrix 200 are associated with a terminator symbol. However, it should be appreciated that in various other embodiments, one or more of the path endpoints are associated with a terminator symbol, making it another objective of the game not to create a complete path between two path endpoints associated with a terminator symbol.

In another embodiment in which the player's objective is to complete a path between two path endpoints, the gaming system provides the player with an award for completing a path between path endpoints associated with different award amounts. In one such embodiment, the player receives the sum of the awards associated with the respective path endpoints. In another such embodiment, certain path endpoints may be associated with negative values. For example, if a complete path is formed between a path endpoint associated with an award of 300 credits and another path endpoint associated with an award of negative 50 credits, the player would receive an award of 250 credits. Similarly, the player would receive an award of 250 credits for completing a path between a path endpoint associated with an award of 200 credits and a path endpoint associated with an award of 50 credits.

In another embodiment, amounts associated with the respective path endpoints of the game are points, which upon the completion of a play of the game are used to randomly determine an award which is ultimately provided to the player.

Figure 7:
FIG. 7 illustrates a table showing point ranges and their respective award ranges and award averages for the random award determination process disclosed herein for one embodiment of the casual wagering game.

Specifically, in one such embodiment, the game is associated with a plurality of point ranges including 0 to 249 points, 250 to 750 points, 751 to 1200 points and greater than 1200 points, as illustrated in table 60 of FIG. 7. Upon completion of a play of the game, the gaming system determines which point range the player's point total is included within. Still referring to FIG. 7, if the gaming system determines that the player has 0 to 249 points, the gaming system randomly selects an award from a plurality of awards ranging from 75 to 750 credits, the average of the plurality of awards being 450 credits. If the gaming system determines that the player has 250 to 750 points, the gaming system randomly selects an award from a plurality of awards ranging from 50 to 1900 credits, the average of the plurality of awards being 500 credits. If the gaming system determines that the player has 751 to 1200 points, the gaming system randomly selects an award from a plurality of awards ranging from 25 to 2,500 credits, the average of the plurality of awards being 550 credits. If the gaming system determines that the player has more than 1200 points, the gaming system randomly selects an award from a plurality of awards ranging from 10 to 5,000 credits, the average of the plurality of awards being 600 credits. It should be appreciated that in various embodiments, the point ranges, award ranges, and award averages may be any suitable values.

The secondary random award determination process explained in the above paragraph compensates for large skill differences between players. Players of all skill levels would receive somewhat similar average awards. However, highly skilled players that have more points, have the potential of receiving much higher awards than unskilled players. For example, referring again to the example in FIG. 7, a player having 1205 points, could receive an award of 5,000 credits, although the probability may be relatively low. On the other hand, the highest award a player having 240 points could receive is 750 credits.

In one embodiment, the gaming system enables a player to earn tiles during a play of a base or other game or purchase tiles to store for later use at the same or a different gaming machine. In various such embodiments, the stored tiles are stored in a memory device local to a gaming device or at a remote memory device which is part of the gaming system. In another such embodiment, the stored tiles are stored on or in association with a player tracking card.

Figure 8:
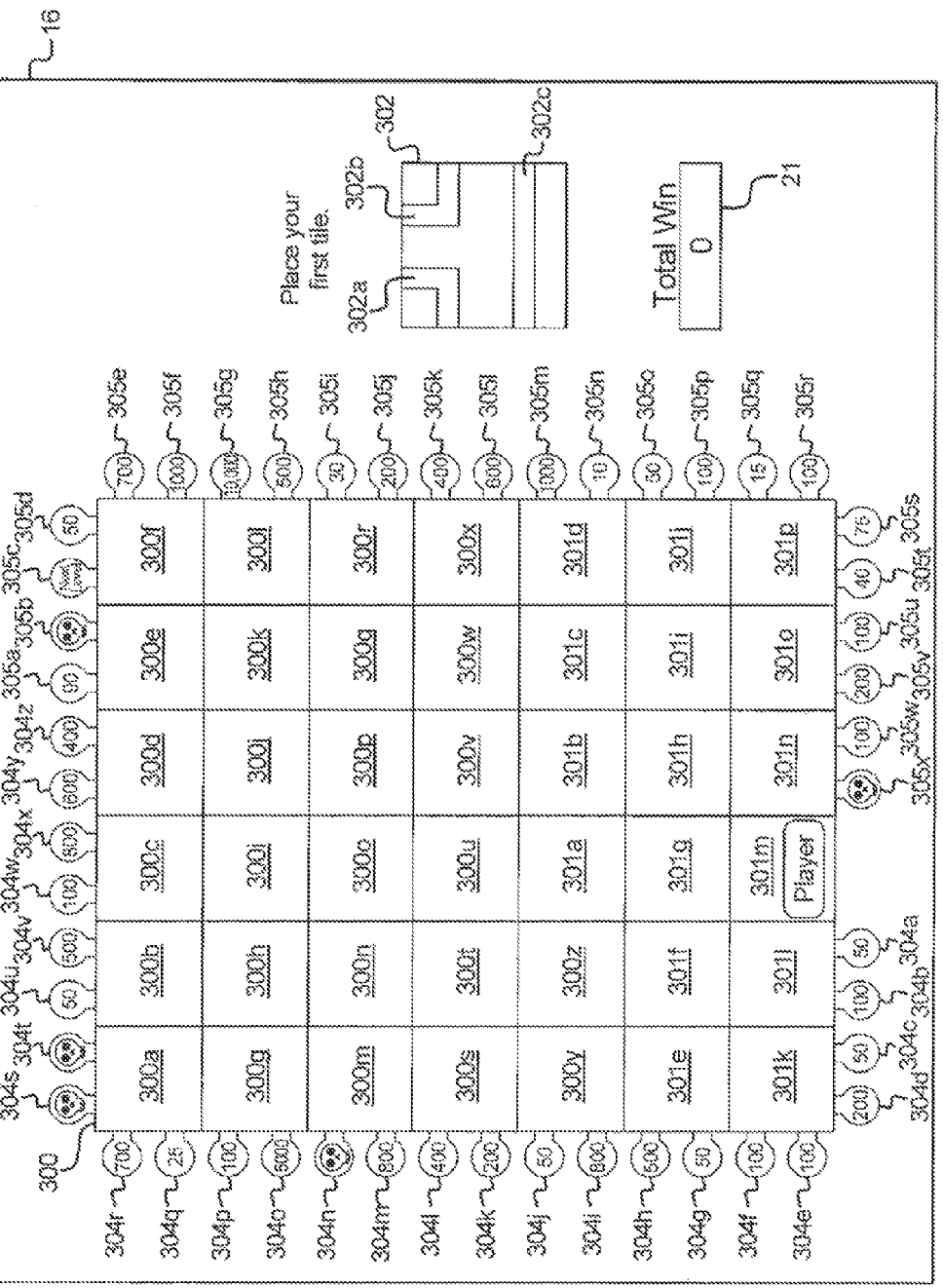
FIG. 8 is a front view of a display of a gaming device enabling a play of one embodiment of the casual wagering game disclosed herein.

Referring now to FIG. 8, in another embodiment, a matrix 300 includes a relatively larger number of positions than in the previous embodiments. Matrix 300 includes positions 300a, 300b, 300c, 300d, 300e, 300f, 300g, 300h, 300i, 300j, 300k, 300l, 300m, 300n, 300o, 300p, 300q, 300r, 300s, 300t, 300u, 300v, 300w, 300x, 300y, 300z, 301a, 301b, 301c, 301d, 301e, 301f, 301g, 301h, 301i, 301j, 301k, 301l, 301m, 301n, 301o and 301p.

Positioned about the border of the matrix 300 are a plurality of path endpoints 304a, 304b, 304c, 304d, 304e, 304f, 304g, 304h, 304i, 304j, 304k, 304l, 304m, 304n, 304o, 304p, 304q, 304r, 304s, 304t, 304u, 304v, 304w, 304x, 304y, 304z, 305a, 305b, 305c, 305d, 305e, 305f, 305g, 305h, 305i, 305j, 305k, 305l, 305m, 305n, 305o, 305p, 305q, 305r, 305s, 305t, 305u, 305v, 305w and 305x.

The gaming system displays the tile 302 and its path segments 302a, 302b and 302c and instructs the player to place the tile 302 at a position in the matrix 300. In this embodiment, the starting position is position 301m. Thus, as illustrated in FIG. 8, it would take at least nine tile placements to reach the furthest position 300f from the starting position 301m. It should be appreciated that in various embodiments, the player may select the starting position. In various other embodiments, the starting position is predetermined or randomly determined by the processor. In various other embodiments, the game includes a plurality of starting positions. In such embodiments, the plurality of starting positions may be player selected or processor selected. In other such embodiments, a player may select one or more of the plurality of starting positions and the processor may select one or more of the plurality of starting positions.

Figure 9:
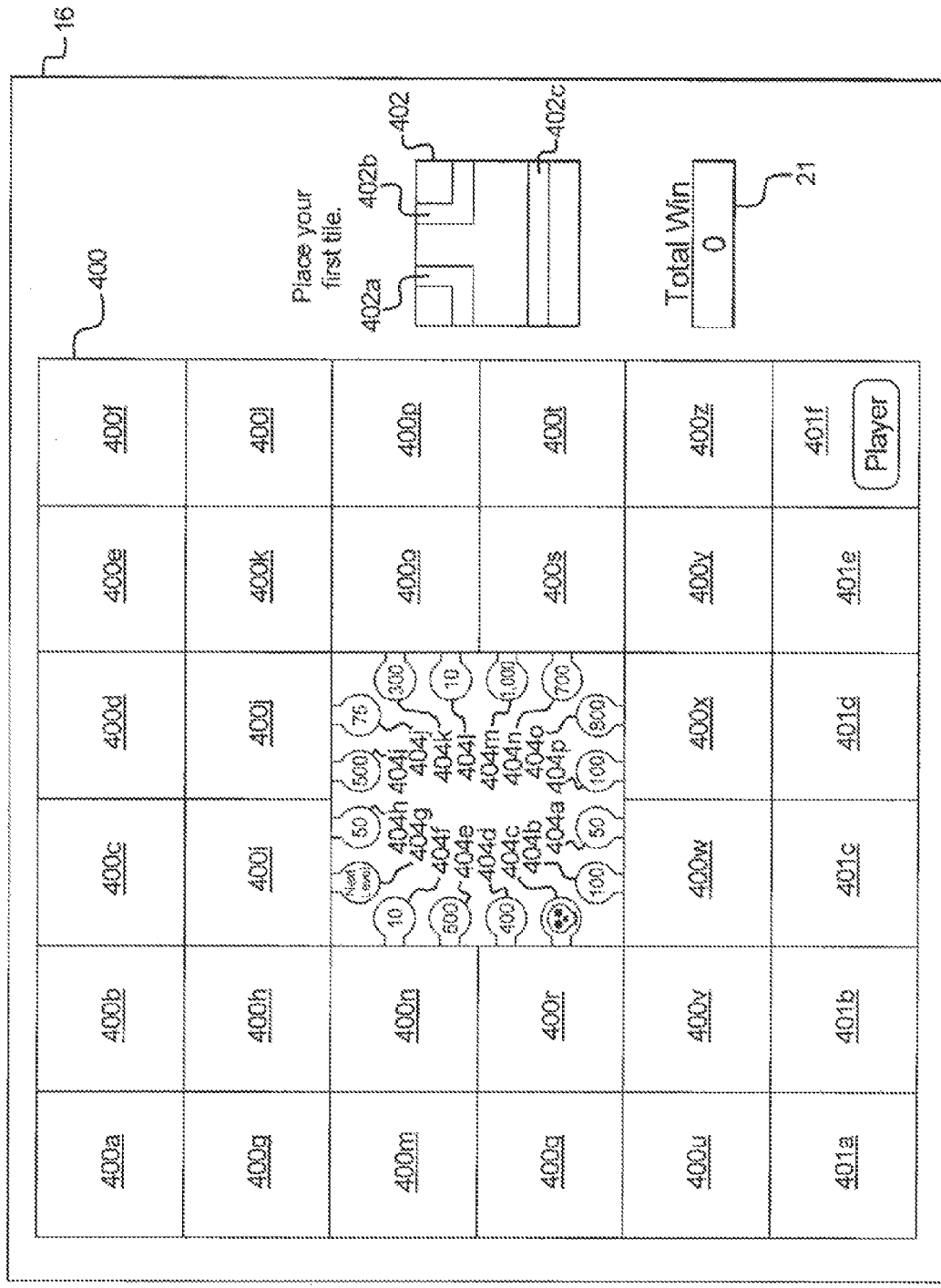
FIG. 9 is a front view of a display of a gaming device enabling a play of one embodiment of the casual wagering game disclosed herein.

FIG. 9 illustrates an alternative embodiment of the casual wagering game in which the path endpoints are positioned about an inner perimeter of matrix 400.

Matrix 400 includes a plurality of positions 400a, 400b, 400c, 400d, 400e, 400f, 400g, 400h, 400i, 400j, 400k, 400l, 400m, 400n, 400o, 400p, 400q, 400r, 400s, 400t, 400u, 400v, 400w, 400x, 400y, 400z, 401a, 401b, 401c, 401d, 401e and 401f, as illustrated in FIG. 9.

Path endpoints 404a, 404b, 404c, 404d, 404e, 404f, 404g, 404h, 404i, 404j, 404k, 404l, 404m, 404n, 404o and 404p are positioned about an inner perimeter of the matrix 400, as illustrated in FIG. 9.

The gaming system displays the tile 402 and its path segments 402a, 402b and 402c and instructs the player to place the tile at a position in the matrix 400. In this embodiment, the starting position is position 401f. In this embodiment, the players objective is still to complete a path from the starting position 401f to one or more desired path endpoints.

It should be appreciated that in another embodiment, the game does not include a start position and the player's objective is to complete a path from an inner or outer perimeter of the matrix 400 to one or more desired path endpoints.

It should be appreciated that in another embodiment, the gaming system displays a plurality of tiles (up to all of the tiles) at the beginning of play of the casual wagering game. In this embodiment, the gaming device enables the player to select the tiles, but after the player selects each tile, the processor randomly places the tile or places the tile in a predetermined manner.

In another embodiment, the gaming device displays a designated number of tiles (e.g., two) each time the player is instructed to select a tile. For example, in one such embodiment, the gaming device displays two tiles. The player places one of the tiles. Then, the gaming device displays two more tiles and the player places one of those tiles.

In another embodiment, the gaming device provides the player with at least one additional award which is a function of the number of complete paths that are formed during a play of the game. In various such embodiments, the additional award is: (a) a predetermined amount of credits, (b) a randomly determined amount of credits, (c) a multiplier; (d) an advancement to a subsequent level; or (e) other suitable award or function. In one embodiment in which the additional award is a multiplier, the multiplier is a number equal to or a multiple of the number of complete paths formed by the player during the play of the game.

In various embodiments, any of the above described games could be offered in a multi-player configuration.

In one multi-player embodiment, the matrix is relatively large and each of a plurality of players are assigned a different starting position. The players take turns placing tiles. In this embodiment, players may build off of other players' tiles (to connect path segments). It should be appreciated that in various other embodiments, players are not enabled to build off of other players' tiles.

The players continue to place tiles at positions in the matrix until one of the players forms a complete path between their respective starting position and one or more path endpoints. The player that completes the path receives any award associated with the path endpoint and the game ends. It should be appreciated that in various embodiments wherein players are enabled to build off of tiles placed by other players, when a complete path is formed, any resulting award is split among all players placing tiles which are part of the complete path in a suitable manner. For example, in one such embodiment, the award is prorated based on how many tiles each respective player placed which are part of the complete path.

In one multi-player embodiment, play of the game continues until a player completes a path ending with a path endpoint associated with a terminator symbol.

In another multi-player embodiment, if a player completes a path which ends with a path endpoint associated with a terminator symbol, only that player is eliminated. Play of the game then continues, until all of the players have completed a path which ends with a path endpoint associated with a terminator symbol, until the players advance to a subsequent level or until no free positions remain.

In another multi-player embodiment, an additional award is provided to the last player still playing the game as a bonus to that respective player for outlasting the other players. In various embodiments, this additional award is predetermined, randomly determined, determined based on the player's performance during one or more plays of the game or determined in any suitable manner.

In another multi-player embodiment, "N" players are allowed to keep playing as long as the "N" players have not collectively completed paths connected to "N" terminator symbols. For example, if there are four players in the game, the players may keep playing until they collectively place tiles that connect to four or more terminator symbols.

In another multi-player embodiment in which players are enabled to build off of other players' tiles, when a player completes a path ending with a path endpoint associated with a terminator symbol, each of the players which placed a tile which is part of the complete path are eliminated from the game. Play of the game then continues, until all of the players have completed a path which ends with a path endpoint associated with a terminator symbol or until the players advance to a subsequent level.

In one multi-player embodiment, when a player completes a path ending with a path endpoint associated with advancement to a subsequent level, all players move to the next level when such a path is completed.

In one multi-player embodiment, the game is a bonus game which is triggered upon the occurrence of a designated triggering event in each of a plurality of players' individual base games and the bonus game is displayed on a large central display. In another such embodiment, players view the bonus game at their own respective gaming device displays.

It should be appreciated that in various other multi-player embodiments, the bonus game is a persistence game, which players may enter at different intervals from play of respective base games based upon the occurrence of a designated triggering event.

In various multi-player embodiments in which the game is a base game, the game starts when a designated number of players have placed a wager on the game. In one such embodiment, if only one player has placed a wager on the game after a designated amount of time, the gaming system simulates the play of one or more additional players.

In another multi-player embodiment, each of a plurality of players are assigned different starting positions on a matrix, from which they build tiles, to ultimately form a complete path between their respective starting position and a path endpoint associated with an award. In one such embodiment, the gaming system enables a player to place a displayed tile onto their path or another player's path. In one such embodiment, if a first player places a tile onto a second player's path, the first player receives at least part of any award resulting from a completion of the path between the second player's starting position and a path endpoint. In another such embodiment, certain tiles are designated as "blocking tiles" (having no path segments, or no useful path segments). A player can place a blocking tile onto another player's path for various strategic reasons (i.e., to keep certain positions open for that player's respective path).

Figure 10B:
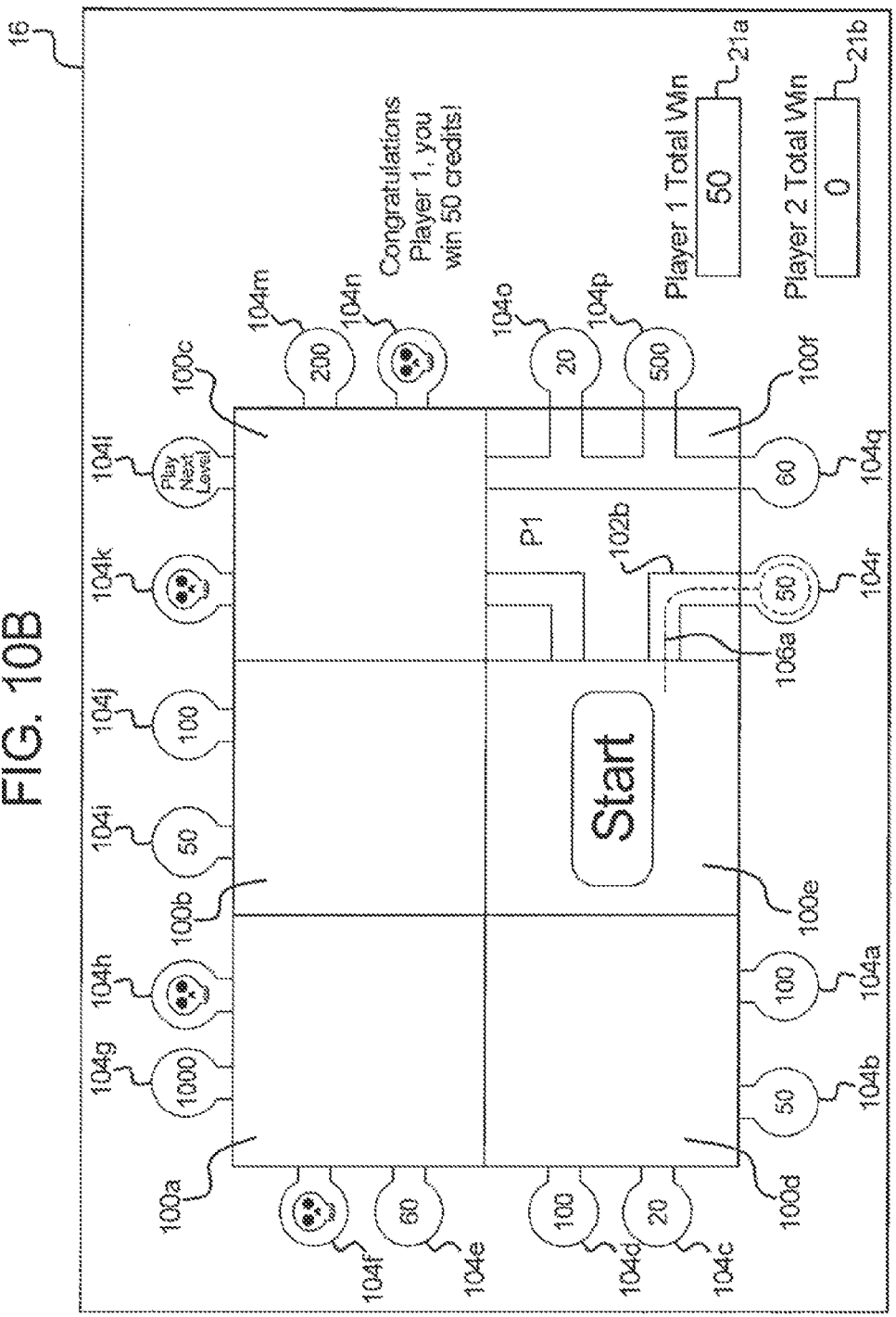

FIGS. 10A to 10H illustrate an example of a multi-player embodiment of the game. Referring to FIG. 10A, the gaming system displays the tile 102 and instructs Player 1 to place tile 102 at one of the positions of the matrix 100. As illustrated in FIG. 10B, Player 1 placed tile 102 at position 100f. After Player 1 has placed the tile 102, the gaming system determines if a complete path is formed between the starting position 102e and one or more of the path endpoints positioned about the perimeter of the matrix 100. Referring to FIG. 10B, in this example, a complete path 106a is formed from the starting position 100e to path endpoint 104r by path segment 102b of tile 102. Path endpoint 104r is associated with an award of 50 credits which is provided to Player 1 as indicated in Player 1 Total Win display 21a in FIG. 10B.

Referring to FIG. 10C, the gaming system displays the tile 103, including path segments 103a, 103b and 103c, and instructs Player 2 to place tile 103 at one of the positions of the matrix 100. It should be appreciated that although in this embodiment, tile 102 is the same as tile 103, in various embodiments, all of the displayed tiles are different. Player 2 placed tile 103 at position 100b, as illustrated in FIG. 10D. In this example, a complete path 106*b* is formed from the starting position 100*e* to path endpoint 104*j* by path segment 103*c* of tile 103. Path endpoint 104*j* is associated with an award of 100 credits which is provided to Player 2 as indicated in Player 2 Total Win display 21*b* in FIG. 10D.

Figure 10E:
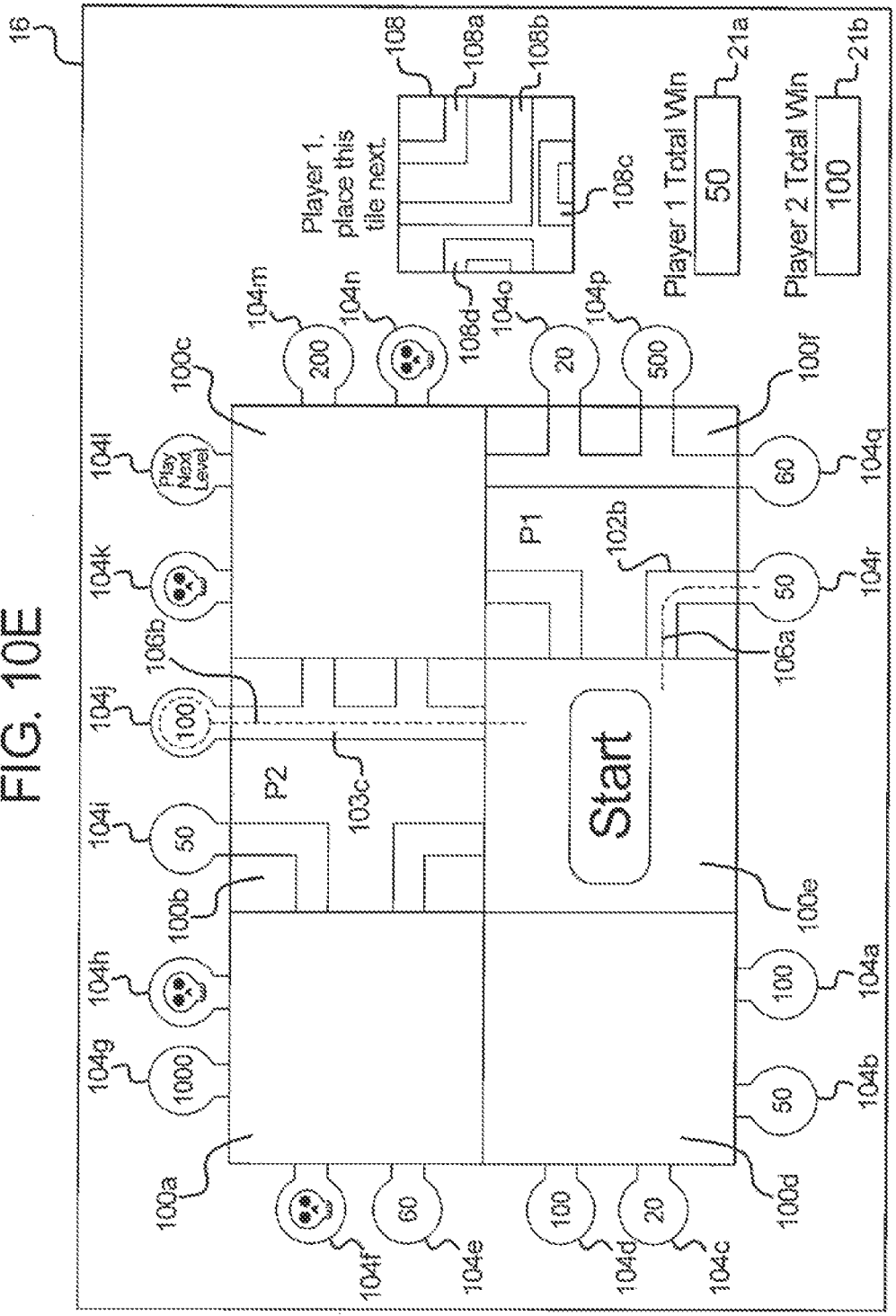

As illustrated in FIG. 10E, the gaming system instructs Player 1 to place tile 108. Player 1 placed tile 108 at position 100*a*, as illustrated in FIG. 10F. Referring to FIG. 10F, in this example, a complete path 106*c* is formed from the starting position 100*e* to path endpoint 104*g* by path segment 103*b* of tile 103 and 108*b* of tile 108. Path endpoint 104*g* is associated with an award of 1000 credits which is provided to Player 1 as indicated in Player 1 Total Win display 21*a* in FIG. 10F.

Figure 10G:
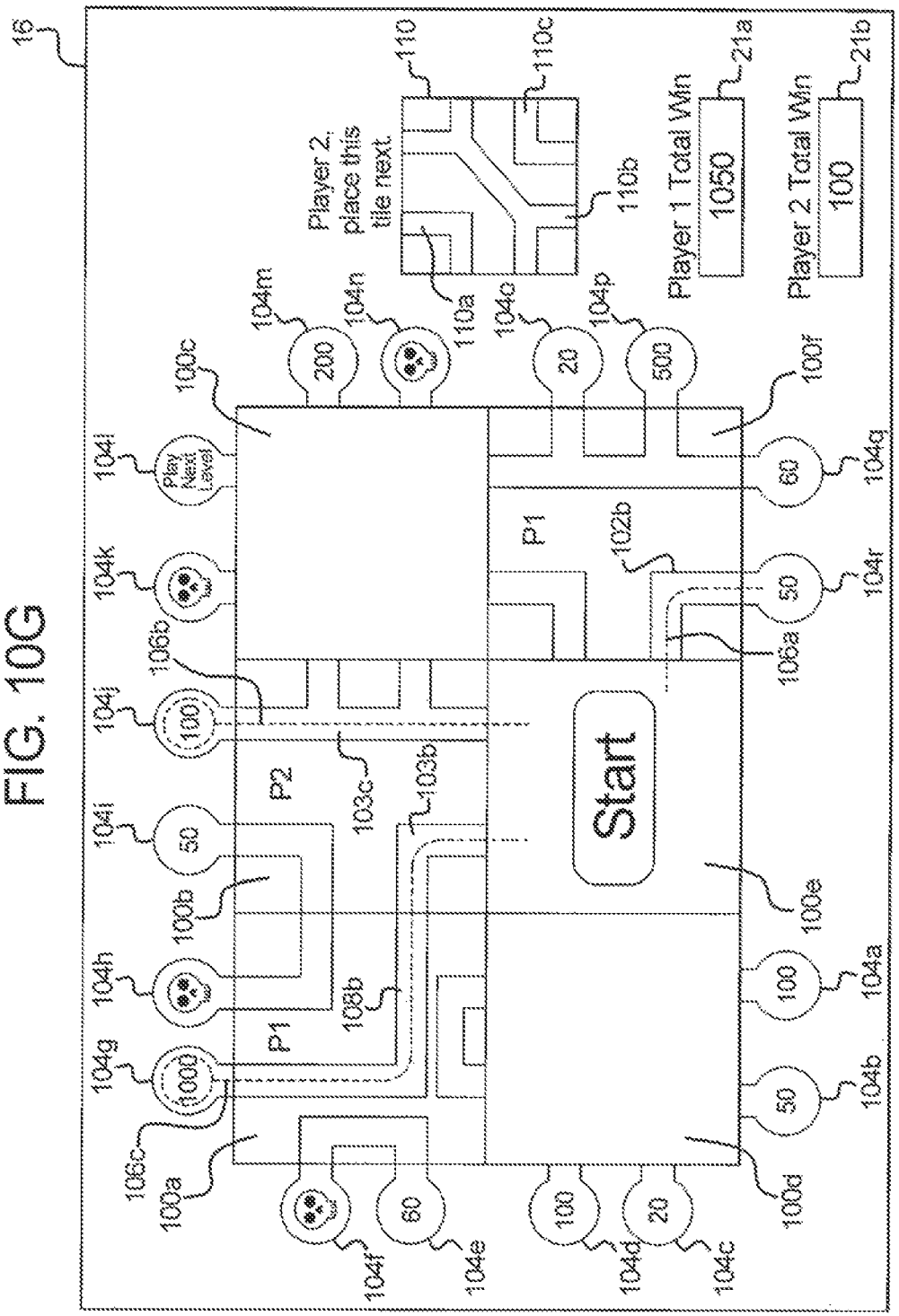

Referring to FIG. 10G, the gaming system next instructs Player 2 to place tile 110 at a position in matrix 100. Referring now to FIG. 10H, Player 2 placed tile 110 at position 100*c*. Referring to FIG. 10G, in this example, a complete path 106*d* is formed from the starting position 100*e* to path endpoint 104*l* by path segment 103*c* of tile 103 and path segment 110*b* of tile 110. Additionally, a complete path 106*e* is formed from the starting position 100*e* to path endpoint 104*m* by path segment 103*c* of tile 103 and path segment 110*b* of tile 110. Path endpoint 104*l* is associated with advancement to a next level and path endpoint 104*m* is associated with an award of 200 credits. In this embodiment, Player 2 receives the award of 200 credits and both players advances to the next level as indicated in FIG. 10H.

In various embodiments, single or multi-player, for a play or round of play of the game, the gaming system displays fewer tiles that positions. In various other embodiments, the gaming system displays an equal number of tiles and open positions.

It should be appreciated that in various other embodiments, awards are associated with positions in a matrix as well as certain path endpoints. Accordingly, in such embodiments a player could get an award for simply placing a tile. In such embodiments, different positions could be associated with different awards. In various other such embodiments, the award associated with placing a tile could increase as more tiles are placed, meaning the player gets a higher award for placing each subsequent tile. In another embodiment, a player receives a bonus award in addition to the awards associated with various path endpoints for placing a tile at each position in the matrix without having completed a path to a path endpoint associated with a terminator symbol.

In another embodiment, different path endpoints positioned about the perimeter of the matrix are associated with different subsequent levels, some of which could have path endpoints associated with higher awards than other path endpoints.

It should be appreciated that in various embodiments, the matrix could be a variety of shapes in addition to square or rectangular (e.g., hexagonal, triangular, circular). It should also be appreciated that the positions may be any suitable shape in addition to square.

It should be appreciated that although in the foregoing example embodiments, one tile is displayed to the player at a time for placement, in various other embodiments, the gaming system displays multiple tiles to a player at one time. In one such embodiment, the gaming system enables the player to select from a plurality of tiles (up to all of the possible tiles) to place at a position in the matrix one at a time. In another such embodiment, while the gaming system displays multiple tiles, the tiles are displayed in a designated order and the player may only place a certain one of the plurality of displayed tiles. In other words, the gaming system enables the player to see what tile or tiles are eligible for placement, or "on deck," after a respective placement. This assists the player in strategically placing tiles to maximize their awards. In another embodiment, the order in which the tile positions get filled on the grid is predetermined, but the player is enabled to choose from a set of possible tiles including up to all of the tiles) each turn to fill in the current grid position.

It various embodiments, the gaming system includes a timer which times the amount of time which elapses from the time the gaming system displays a tile for placement to the time the player places the tile at a position in the matrix. In various embodiments, if a designated amount of time elapses and the player has not placed the tile at a position in the matrix, the gaming system: (a) randomly places the tile at a position in the matrix; (b) places the tile at a position in the matrix according to an identified level of skill of the player (pending jurisdiction); (c) ends the play of the game; or (d) takes any other suitable action.

In various embodiments, if the player is using a player tracking card, the gaming system saves the player's level of play and the player can pick up play of the game at a later time where they left off.

In various other embodiments, the gaming system does not display awards associated with path endpoints positioned about the perimeter of the matrix. Rather, the gaming system determines the award ultimately provided to the player for forming a complete path randomly or using central determination.

It should be appreciated that in other embodiments, a plurality of path endpoints positioned about the perimeter of the matrix are associated with awards, however only certain of the awards are displayed to the player prior to the player receiving the respective awards.

In various other embodiments, a plurality of path endpoints positioned about the perimeter of the matrix are associated with awards and the gaming system displays such awards during an entire play of the game or level. However, in such embodiments, after the player forms a complete path, the gaming system causes the awards associated with the path endpoints to spin counterclockwise or clockwise. After the awards stop spinning, the player receives the award associated with the path endpoint or path endpoints to which a complete path was formed. It should be appreciated that in such embodiments, the spinning may stop randomly or a predetermined fashion. It should also be appreciated that in various embodiments, certain path endpoints in such a configuration may be associated with terminators and certain path endpoints may be associated with advancement to a subsequent level. In such an embodiment, terminator symbols and symbols indicating advancement to a subsequent level spin along with the award symbols. It should also be appreciated that in various embodiments, the symbols associated with the path endpoints may spin upon the occurrence of any suitable event. It should also be appreciated that in various such embodiments, the symbols associated with the path endpoints could be randomly rearranged, rearranged in a predetermined fashion or rearranged in any suitable fashion.

It should be appreciated that in various embodiments, a player may receive more helpful tiles for placing a higher wager in a base game or placing a side wager. In one embodiment, if the player makes an additional wager, the player is given the choice between two or more tiles to place for each turn, as opposed to one tile. In another embodiment, the player is allowed to rotate one or more of the tiles if the player makes an additional wager. In another embodiment, the player's chance of getting a "wild tile" (a tile that connects in all directions) increases if the player makes an additional wager.

In another embodiment, if the player makes an additional wager, the player receives tiles with more connections on average. In another embodiment, the player is given one or more extra "lives" if the player makes an additional wager. Each extra "life" allows the player to connect to one terminator symbol without terminating the game play session. For example, in one embodiment, if the player connects to one terminator symbol, the game ends, but if the player makes an additional wager, the player may be allowed to connect to two or more terminator symbols before the game ends. In another embodiment, the player may earn a multiplier on all of their winnings if the player makes an additional wager.

It should be appreciated that each of the foregoing examples are for illustrative purposes and that any of the features of any of the examples or other disclosure herein may be combined in any manner.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating a gaming system, said method comprising:
   after receiving, via an acceptor, a physical item associated with a monetary value; identifying, via the acceptor, the received physical item; and causing at least one processor to execute a plurality of instructions to establish a credit balance, for a play of a game:
   (A) causing at least one processor to execute a plurality of instructions to operate with at least one display device to display a matrix including a plurality of positions;
   (B) causing the at least one processor to execute the plurality of instructions to operate with the at least one display device to display a first one of a plurality of tiles, each of the tiles including a plurality of distinct non-intersecting path segments;
   (C) causing the at least one processor to execute the plurality of instructions to operate with at least one input device to receive a selection of one of the positions not displaying any of the tiles and to operate with the at least one display device to display said first tile at said selected position;
   (D) causing the at least one processor to execute the plurality of instructions to determine if a complete path has been formed by one or more of the path segments of any tiles displayed at the plurality of positions from a starting position to one or more of a plurality of path endpoints;
      (i) when a complete path has not been formed and at least one of the plurality of positions does not display any of the tiles, causing the at least one processor to execute the plurality of instructions to operate with the at least one display device to display another one of the tiles and repeat (C) to (D) for said other displayed tile in association with the same matrix and the same plurality of positions; and
      (ii) when a complete path has been formed, causing the at least one processor to execute the plurality of instructions to:
         (a) determine any awards associated with the one or more path endpoints;
         (b) operate with the at least one display device to display and provide any determined awards to the player; and
         (c) when at least one of the plurality of positions does not display any of the tiles, operate with the at least one display device to display another one of the tiles and repeat (C) to (D) for said other displayed tile in association with the same matrix and the same plurality of positions; and
   (E) if an actuation of a cashout button is received, causing the processor to initiate a payout associated with the credit balance.

2. The method of claim 1, wherein the game is a multi-player game played by a plurality of players.

3. The method of claim 2, wherein the plurality of instructions, when executed by the at least one processor, cause the at least one processor to operate with the at least one input device to enable each of the players to select one of the positions in an alternating fashion.

4. The method of claim 2, which includes causing the at least one processor to execute the plurality of instructions to operate with the at least one input device to enable each of the players to select one of the positions in an alternating fashion until: (a) a complete path is formed from the starting position to one of the path endpoints associated with an award; (b) a complete path is formed from the starting position to one of the path endpoints associated with a terminator symbol; or (c) a complete path is formed from the starting position to one of the path endpoints associated with advancement to a subsequent level.

5. The method of claim 2, which includes causing the at least one processor to execute the plurality of instructions to, when a complete path is formed from the starting position to one of the path endpoints associated with an award, provide the award to the player who selected the position at which the tile which completed the complete path was displayed.

6. The method of claim 2, which includes causing the at least one processor to execute the plurality of instructions to, when a complete path is formed from the starting position to one of the path endpoints associated with an award, split the award among each of the players who selected at least one of the positions at which one of the tiles that is part of the complete path is displayed.

7. The method of claim 2, which includes causing the at least one processor to execute the plurality of instructions to end said play of the game for all of the players when a complete path is formed from the starting position to one of the path endpoints associated with a terminator symbol.

8. The method of claim 2, which includes causing the at least one processor to execute the plurality of instructions to, when a complete path is formed from the starting position to one of the path endpoints associated with a terminator symbol, end said play of the game for the player who caused the complete path to be formed.

9. The method of claim 2, which includes causing the at least one processor to execute the plurality of instructions to, when a complete path is formed from the starting position to one of the path endpoints associated with advancement to a subsequent level, cause the player that caused the complete path to be formed to advance to the subsequent level.

10. The method of claim 2, which includes causing the at least one processor to execute the plurality of instructions to, when a complete path is formed from the starting position to one of the path endpoints associated with advancement to a subsequent level, cause all of the players to advance to the subsequent level.

11. The method of claim 1, which includes causing the at least one processor to execute the plurality of instructions to operate with the at least one display device to display one of the tiles to the player at a time.

12. The method of claim 1, which is provided through a data network.

13. The method of claim 12, wherein the data network is an internet.

14. A method of operating a gaming system, said method comprising:
   after receiving, via an acceptor, a physical item associated with a monetary value; identifying, via the acceptor, the received physical item; and causing at least one processor to execute a plurality of instructions to establish a credit balance, for a play of a game:
   (A) causing at least one processor to execute a plurality of instructions to operate with at least one display device to display a matrix including a plurality of positions;
   (B) causing the at least one processor to execute the plurality of instructions to operate with the at least one display device to display a plurality of path endpoints in association with the positions of the matrix, wherein each of a plurality of the path endpoints is associated with one of a plurality of different award symbols;
   (C) causing the at least one processor to execute the plurality of instructions to operate with the at least one display device to display a first one of a plurality of tiles, each of the tiles including a plurality of distinct non-intersecting path segments:
   (D) causing the at least one processor to execute the plurality of instructions to operate with at least one input device to receive a selection of one of the positions not displaying any of the tiles, and display said first tile at said selected position;
   (E) causing the at least one processor to execute the plurality of instructions to determine if a complete path has been formed by one or more of the path segments of any tiles displayed at the plurality of positions between two of the path endpoints that are associated with a same one of the award symbols;
      (i) when the complete path has not been formed and at least one of the plurality of positions does not display any of the tiles, causing the at least one processor to execute the plurality of instructions to operate with the at least one display device to display another one of the tiles and repeat (D) to (E) for said other displayer tile in association with the same matrix and the same plurality of positions; and
      (ii) when the complete path has been formed, causing the at least one processor to execute the plurality of instructions to:
         (a) determine an award associated with said one of the award symbols associated with the two path endpoints; and
         (b) operate with the at least one display device to display and provide said determined award to the player; and
   (F) if an actuation of a cashout button is received, causing the processor to initiate a payout associated with the credit balance.

15. The method of claim 14, wherein the game is a multi-player game played by a plurality of players.

16. The method of claim 15, which includes causing the at least one processor to execute the plurality of instructions to operate with the at least one input device to enable each of the players to select one of the positions in an alternating fashion until: (a) a complete path is formed between two of the path endpoints associated with a same one of the award symbols; (b) a complete path is formed between two of the path endpoints associated with a terminator symbol; or (c) a complete path is formed between two of the path endpoints associated with advancement to a subsequent level.

17. The method of claim 15, which includes causing the at least one processor to execute the plurality of instructions to, when a complete path is formed, provide any resulting award to the player who selected the position at which the tile which completed the complete path was displayed.

18. The method of claim 15, which includes causing the at least one processor to execute the plurality of instructions to, when a complete path is formed, split any resulting award among the players who selected at least one of the positions at which one of the tiles that is part of the complete path is displayed.

19. The method of claim 15, which includes causing the at least one processor to execute the plurality of instructions to end said play of the game for all of the players when the two path endpoints are each associated with a terminator symbol.

20. The method of claim 15, which includes causing the at least one processor to execute the plurality of instructions to end said play of the game for the player who caused a complete path to be formed when the two path endpoints are each associated with a terminator symbol.

21. The method of claim 15, which includes causing the at least one processor to execute the plurality of instructions to cause the player who caused the complete path to be formed to advance to a subsequent level when the two path endpoints are each associated with advancement to the subsequent level.

22. The method of claim 15, which includes causing the at least one processor to execute the plurality of instructions to cause all of the players to advance to a subsequent level when the two path endpoints are each associated with advancement to the subsequent level.

23. The method of claim 14, which is provided through a data network.

24. The method of claim 23, wherein the data network is an internet.

25. A method of operating a gaming system, said method comprising:
   after receiving, via an acceptor, a physical item associated with a monetary value; identifying, via the acceptor, the received physical item; and causing at least one processor to execute a plurality of instructions to establish a credit balance, for a play of a game:
   (A) causing at least one processor to execute a plurality of instructions to operate with at least one display device to display a matrix including a plurality of positions; and
   (B) for one of a plurality of tiles which each include a plurality of path segments, causing the at least one processor to execute the plurality of instructions to:
      (i) operate with the at least one display device to display the tile;
      (ii) operate with at least one input device to receive a signal causing the at least one display device to display the tile at a selected position of the matrix;
      (iii) determine if a complete path has been formed by one or more of the path segments of any displayed tiles from a starting position to one or more of a plurality of path endpoints, one of the path endpoints being associated with a terminator symbol, another one of the path endpoints being associated with an award;
         (1) if the complete path has not been formed, operate with the at least one display device to display another one of the tiles and repeat (ii) to (iii) for said other displayed tile; and (2) if the complete path has been formed by one or more of the path segments of any displayed tiles from: (1) the starting position to the path endpoint associated with the award, and (2) the starting position to the path endpoint associated with the terminator symbol, end said play of the game without providing the player the award; and (iv) if the complete path has been formed by one or more of the path segments of any displayed tiles from the starting position to the path endpoint associated with the award and the complete path has not been formed by one or more of the path segments of any displayed tiles from the starting position to the path endpoint associated with the terminator, operate with the at least one display device to display and provide the award to the player; and (C) if an actuation of a cashout button is received, causing the processor to initiate a payout associated with the credit balance.

26. The method of claim 25, which is provided through a data network.

27. The method of claim 26, wherein the data network is an internet.

28. A method of operating a gaming system, said method comprising:

after receiving, via an acceptor, a physical item associated with a monetary value; identifying, via the acceptor, the received physical item; and causing at least one processor to execute a plurality of instructions to establish a credit balance, for a play of a game:

(A) causing at least one processor to execute a plurality of instructions to operate with at least one display device to display a matrix including a plurality of positions; and (B) for one of a plurality of tiles which each include a plurality of path segments, causing the at least one processor to execute the plurality of instructions to:

(i) operate with the at least one display device to display the tile;

(ii) operate with at least one input device to receive a signal causing the at least one display device to display the tile at a selected position of the matrix;

(iii) determine if a complete path has been formed by one or more of the path segments of any displayed tiles from a starting position to one or more of a plurality of path endpoints, one of the path endpoints being associated with advancement to a subsequent level, another one of the path endpoints being associated with an award;

(1) if the complete path has not been formed, operate with the at least one display device to display another one of the tiles and repeat (ii) to (iii) for said other displayed tile; and (2) if the complete path has been formed by one or more of the path segments of any displayed tiles from: (1) the starting position to the path endpoint associated with the award, and (2) the starting position to the path endpoint associated with advancement to the subsequent level, operate with the at least one display device to display and provide the award to the player without advancing the player to the subsequent level; and (iv) if the complete path has not been formed by one or more of the path segments of any displayed tiles from the starting position to the path endpoint associated with advancement to the subsequent level and the complete path has not been formed by one or more of the path segments of any displayed tiles from the starting position to the path endpoint associated with the award, advance the player to the subsequent level; and (C) if an actuation of a cashout button is received, causing the processor to initiate a payout associated with the credit balance.

29. The method of claim 28, which is provided through a data network.

30. The method of claim 29, wherein the data network is an internet.

* * * * *